US012769598B2

(12) United States Patent
Saito et al.

(10) Patent No.: US 12,769,598 B2
(45) Date of Patent: Oct. 20, 2026

(54) API MANAGEMENT SYSTEM AND API MANAGEMENT METHOD

(71) Applicant: Hitachi, Ltd., Tokyo (JP)

(72) Inventors: Nariyuki Saito, Tokyo (JP); Yu Nakata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 406 days.

(21) Appl. No.: 18/556,462

(22) PCT Filed: Mar. 1, 2022

(86) PCT No.: PCT/JP2022/008550

§ 371 (c)(1),
(2) Date: Oct. 20, 2023

(87) PCT Pub. No.: WO2022/224588

PCT Pub. Date: Oct. 27, 2022

(65) Prior Publication Data

US 2024/0193022 A1 Jun. 13, 2024

(30) Foreign Application Priority Data

Apr. 22, 2021 (JP) ................................. 2021-072791

(51) Int. Cl.
*G06F 9/54* (2006.01)

(52) U.S. Cl.
CPC .............. *G06F 9/547* (2013.01); *G06F 9/543* (2013.01)

(58) Field of Classification Search
None
See application file for complete search history.

(56) References Cited

U.S. PATENT DOCUMENTS 9,300,759 B1 * 3/2016 Jorgensen ............... G06F 9/541
11,842,224 B1 * 12/2023 Sharifi Mehr .......... G06F 9/547
(Continued)

FOREIGN PATENT DOCUMENTS

JP 2011-141587 A 7/2011
JP 2016-151780 A 8/2016
(Continued)

OTHER PUBLICATIONS

Japanese Office Action issued on Oct. 22, 2024 for Japanese Patent Application No. 2021-072791.
(Continued)

*Primary Examiner* — Charles E Anya
(74) *Attorney, Agent, or Firm* — Volpe Koenig

(57) ABSTRACT

To determine a communication scheme capable of causing an API to be efficiently executed in accordance with a processing content of the API. An API management system includes an API processing time estimation unit that acquires information of an execution request of an API, estimates a required time required for a predetermined information processing apparatus to execute the API in response to the information of the execution request of the API by analyzing a processing content of the API indicated by the execution request of the API, and determines a communication scheme used for transmitting a request for causing the predetermined information processing apparatus to execute the API to be either synchronous communication or asynchronous communication based on the estimated time.

14 Claims, 19 Drawing Sheets

(56) References Cited

U.S. PATENT DOCUMENTS

| | | | | |
|---|---|---|---|---|
| 2013/0326520 | A1* | 12/2013 | Demircioglu | G06F 9/541 718/100 |
| 2014/0280703 | A1 | 9/2014 | Vaks et al. | |
| 2015/0095923 | A1* | 4/2015 | Sarid | G06F 9/451 719/328 |
| 2019/0268442 | A1* | 8/2019 | Puniani | H04L 67/02 |

FOREIGN PATENT DOCUMENTS

| | | | | |
|---|---|---|---|---|
| JP | 2018-81431 | A * | 5/2018 | G06F 8/70 |
| JP | 2019-105977 | A | 6/2019 | |
| JP | 2019-200691 | A | 11/2019 | |

OTHER PUBLICATIONS

International Search Report, PCT/JP2022/008550, May 31, 2022, 2 pgs.

* cited by examiner

FIG. 3

API DEFINITION DATA T1

811 812 813 814 821 822 823 824 825 826

| API ID (811) | API DEFINITION DATA FOR API SERVER COMMUNICATION (812) | | | | API DEFINITION DATA FOR CLIENT APPLICATION COMMUNICATION (813) | | REQUEST FEATURE AMOUNT FOR ESTIMATION OF API PROCESSING TIME (814) |
|---|---|---|---|---|---|---|---|
| | REQUEST TYPE (821) | REQUEST FORMAT (822) | RESPONSE FORMAT (823) | ASYNCHRONOUS PROCESSING IDENTIFIER FIELD (824) | PATH (825) | REQUEST METHOD IN SYNCHRONOUS COMMUNICATION (826) | |
| 801 0 | ASYNCHRONOUS HTTP PROCESSING REQUEST | POST https://server-AA.com/aa/tasks HEADER: … PAYLOAD: {"data": …, "pp": …} | 202 Accepted PAYLOAD: {"task_id": …} | task_id | /api-AA/aa | POST | · TOTAL PAYLOAD SIZE · IN-PAYLOAD PARAMETER "pp" · REQUEST TIME POINT |
| 802 1 | ASYNCHRONOUS HTTP PROCESSING PROGRESS CONFIRMATION | GET https://server-AA.com/aa/tasks/{task_id} HEADER: … | · PROCESSING INCOMPLETE → 200 OK PAYLOAD: {"task": "processing"} · PROCESSING COMPLETED → 200 OK PAYLOAD: {"task": "completed", "result": …} | task_id | /api-AA/aa | None | None |
| 803 2 | SYNCHRONOUS HTTP | GET https://server-BB.net/bb QUERY PARAMETER: {"qq": …} | 200 OK PAYLOAD: {"data": …} | None | /api-BB/bb | GET | · QUERY PARAMETER "qq" |
| 804 3 | ASYNCHRONOUS Websocket PROCESSING REQUEST | wss://server-CC.co.jp/cc PAYLOAD: {"rr": …} | · PROCESSING ACCEPTANCE → PAYLOAD: {"status": "accepted", "job-id": …} · PROCESSING COMPLETED → PAYLOAD: {"status": "finished", "job-id": … "result": …} | job-id | /api-CC/cc | POST | · IN-PAYLOAD PARAMETER "rr" |
| … | … | … | … | … | … | … | … |

FIG. 4

API PROCESSING TIME PERFORMANCE DATA T2

| | 911 REQUEST ID | 912 CLIENT APPLICATION ID | 811 API ID | 913 API PROCESSING START TIME POINT | 914 API PROCESSING END TIME POINT | 915 PERFORMANCE VALUE OF REQUEST FEATURE AMOUNT FOR ESTIMATION OF API PROCESSING TIME |
|---|---|---|---|---|---|---|
| 901 | 0 | 2 | 0 | 2020/11/10 00:00:00 | 2020/11/10 00:00:01 | · TOTAL PAYLOAD SIZE: 1 MB<br>· IN-PAYLOAD PARAMETER "pp": 10 |
| 902 | 1 | 1 | 0 | 2020/11/10 01:00:00 | 2020/11/10 01:02:00 | · TOTAL BODY SIZE: 30 MB<br>· IN-PAYLOAD PARAMETER "pp": 2 |
| 903 | 2 | 1 | 2 | 2020/11/12 10:10:10 | 2020/11/12 10:10:40 | · QUERY PARAMETER "qq": 20 |
| | ... | ... | ... | ... | ... | ... |

FIG. 5

API REQUEST/RESPONSE MANAGEMENT DATA T3

| | 911 REQUEST ID | 912 CLIENT APPLICATION ID | 811 API ID | 913 API PROCESSING START TIME POINT | 1011 COMMUNICATION SCHEME DESIGNATED BY CLIENT APPLICATION | 915 PERFORMANCE VALUE OF REQUEST FEATURE AMOUNT FOR ESTIMATION OF API PROCESSING TIME | 1012 ASYNCHRONOUS PROCESSING IDENTIFIER | 1013 CURRENT PROCESSING STATUS |
|---|---|---|---|---|---|---|---|---|
| 1001 | 0 | 2 | 0 | 2020/11/10 00:00:00 | SYNCHRONOUS HTTP | · TOTAL PAYLOAD SIZE: 1 MB<br>· IN-PAYLOAD PARAMETER "pp": 10 | · FOR API SERVER: 1 | · COMPLETION OF TRANSMISSION OF PROCESSING REQUEST API REQUEST TO API SERVER. |
| 1002 | 1 | 1 | 0 | 2020/11/10 01:00:00 | ASYNCHRONOUS Websocket | · TOTAL PAYLOAD SIZE: 30 MB<br>· IN-PAYLOAD PARAMETER "pp": 2 | · FOR CLIENT APPLICATION: 0<br>· FOR API SERVER: 2 | · COMPLETION OF RECEPTION OF PROCESSING ACCEPTANCE API RESPONSE FROM API SERVER. |
| 1003 | 2 | 1 | 2 | 2020/11/12 10:10:10 | ASYNCHRONOUS HTTP | · QUERY PARAMETER "qq": 20 | · FOR CLIENT APPLICATION: 1 | · COMPLETION OF RECEPTION OF API RESPONSE FROM API SERVER. (RESPONSE CONTENT: 200 OK PAYLOAD: {"data": "..."}) |
| 1004 | 3 | 0 | 3 | 2020/11/13 13:00:00 | SYNCHRONOUS HTTP | · IN-PAYLOAD PARAMETER "rr": 10 | · FOR API SERVER: 3 | · COMPLETION OF RECEPTION OF PROCESSING ACCEPTANCE API RESPONSE FROM API SERVER. |
| | ... | ... | ... | ... | ... | ... | ... | ... |

CASE WHERE CLIENT APPLICATION AND API MANAGEMENT SYSTEM USE SYNCHRONOUS HTTP METHOD, AND API MANAGEMENT SYSTEM AND API SERVER USE ASYNCHRONOUS HTTP METHOD

CASE WHERE CLIENT APPLICATION AND API MANAGEMENT SYSTEM USE ASYNCHRONOUS Websocket METHOD, AND API MANAGEMENT SYSTEM AND API SERVER USE SYNCHRONOUS HTTP METHOD CASE WHERE CLIENT APPLICATION AND API MANAGEMENT SYSTEM USE SYNCHRONOUS HTTP METHOD, AND API MANAGEMENT SYSTEM AND API SERVER USE ASYNCHRONOUS Websocket METHOD

API REQUEST RESPONSE PROCESS IN EXECUTION PHASE

COMMUNICATION SCHEME PROPOSAL PROCESSING

SYNCHRONOUS/ASYNCHRONOUS COMMUNICATION SCHEME PROPOSAL SCREEN

API MANAGEMENT SYSTEM AND API MANAGEMENT METHOD

BACKGROUND

Technical Field

The present invention relates to an API management system and an API management method.

Background Art

INCORPORATION BY REFERENCE

This application claims priority to Japanese Patent Application No. 2021-072791 filed on Apr. 22, 2021, the contents of which are incorporated herein by reference.

In recent years, the trend toward digital transformation (DX), which aims to create new services and improve business efficiency with digital technology, is accelerating. A system for realizing DX is often required to be rapidly developed, and is widely constructed as a System of Systems, which is obtained by combining a plurality of known services and systems.

An application programming interface (API) disclosed by a plurality of services or systems is generally used as means for combining the plurality of services or systems. For example, in a case where a service that provides a data analysis function discloses the data analysis function as an API, the developer of a DX system can use the data analysis function merely by describing a process of making an API request in a program. Hereinafter, a system that discloses an API is referred to as an API server, and a system that requests the API is referred to as a client application.

Communication schemes between a client application and an API server includes a synchronous scheme and an asynchronous scheme. The client application needs to implement processing of a request (API request) to the API server based on the communication scheme provided by the API server. For example, in the synchronous scheme, after the client application makes an API request, the API server performs processing according to the content of the API request. After the processing (API processing) corresponding to the API request is completed, an API response including the processing result of the API processing is transmitted to the client application. On the other hand, in the asynchronous scheme, for example, after the client application makes an API request to the API server, the API server transmits an API response indicating completion of acceptance of the API processing to the client application without waiting for completion of the API processing according to the content of the API request. Thereafter, when the API processing in the API server is completed, the API server transmits a processing result of the API processing from the API server to the client application by a response to polling from the client application to the API server or a push from the API server to the client application.

The optimal communication scheme between the client application and the API server depends on the processing content in the API server. For example, in the case of an API requiring time for processing, an asynchronous scheme is desirable. This is because it is possible to prevent an occurrence of a situation in which the client application continuously secures a thread for waiting for the arrival of a response or a calculation resource required for a network connection for a long time. On the other hand, an API of the asynchronous scheme has a disadvantage that the program description of an API request in the client application tends to be more complicated than that in the synchronous scheme, and the burden on the developer of the client application increases. Thus, it is desirable that the communication scheme of an API that does not require time for processing be the synchronous scheme.

However, the communication scheme that can be accepted by the API server is not necessarily optimal for the processing content.

Therefore, there is a technique for performing conversion between the synchronous scheme and the asynchronous scheme by introducing a system that relays communication between the client application and the API server. Such a system is referred to as an API management system below. For example, PTL 1 discloses a technique for converting a communication scheme in an API management system so that a client application and the API management system use an asynchronous scheme and the API management system and an API server use a synchronous scheme. In addition, PTL 2 also discloses a technique of an API management system that performs conversion between a synchronous scheme and an asynchronous scheme. In particular, in the technique disclosed in PTL 2, a database management system is assumed as an API server, and an API management system determines, for each API, whether communication between a client application and the API management system is performed in a synchronous manner or an asynchronous manner, in accordance with the processing content in the database.

CITATION LIST

Patent Literature

PTL 1: JP 2019-105977 A
PTL 2: JP 2019-200691 A

SUMMARY OF INVENTION

Technical Problem

However, depending on the API, the processing time of the API may vary greatly in accordance with the amount of data included in the API request, a request parameter, a request time point, or the like. For example, in the API that provides the data analysis function, it is assumed that the processing time lengthens as the amount of analysis target data designated by the API request increases.

Therefore, which of the synchronous and asynchronous communication schemes is suitable for the same API largely depends on the content of the API request transmitted by the client application.

In the techniques disclosed in PTL 1 and PTL 2, the communication scheme between the client application and the API management system has been fixed to either the synchronous communication scheme or the asynchronous communication scheme for the same API. Thus, it is not possible for a client application developer to select an appropriate communication scheme from these communication schemes. As a result, for example, even though the processing time of a certain API in the API server is short, the client application and the API management system communicate in an asynchronous manner, and thus there is a possibility of the development burden on the client application developer being unnecessarily increased. Conversely, there may be a case where, even though the processing time of a certain API in the API server is long, the client application and the API management system communicate in a synchronous manner, and thus resource consumption of the client application is unnecessarily increased.

The present invention has been made in view of such circumstances, and has as an object to provide an API management system and an API management method capable of determining a communication scheme capable of causing an API to be efficiently executed in accordance with a processing content of the API.

Solution to Problem

According to an aspect of the present invention to achieve the above object, an API management system includes a processor and a memory, and includes an API processing time estimation unit that acquires information of an execution request of an API, estimates a required time required for a predetermined information processing apparatus to execute the API in response to the information of the execution request of the API by analyzing a processing content of the API indicated by the information of the execution request of the API, and determines a communication scheme used for transmitting a request for causing the predetermined information processing apparatus to execute the API to be either synchronous communication or asynchronous communication based on the estimated time.

According to another aspect of the present invention to achieve the above object, there is provided an API management method of causing an information processing apparatus to execute API processing time estimation processing including acquiring information of an execution request of an API, estimating a required time required for a predetermined information processing apparatus to execute the API in response to the information of the execution request of the API by analyzing a processing content of the API indicated by the information of the execution request of the API, and determining a communication scheme used for transmitting a request for causing the predetermined information processing apparatus to execute the API to be either synchronous communication or asynchronous communication based on the estimated time.

Advantageous Effects of Invention

According to the present invention, it is possible to determine a communication scheme capable of causing an API to be efficiently executed in accordance with a processing content of the API.

Objects, configurations, and effects other than those described above will be clarified in the following description of embodiments.

BRIEF DESCRIPTION OF DRAWINGS

FIG. 3 is a diagram illustrating an example of API definition data.

FIG. 4 is a diagram illustrating an example of API processing time performance data.

FIG. 5 is a diagram illustrating an example of API request/response management data.

DESCRIPTION OF EMBODIMENTS

Embodiment 1

Figure 1:
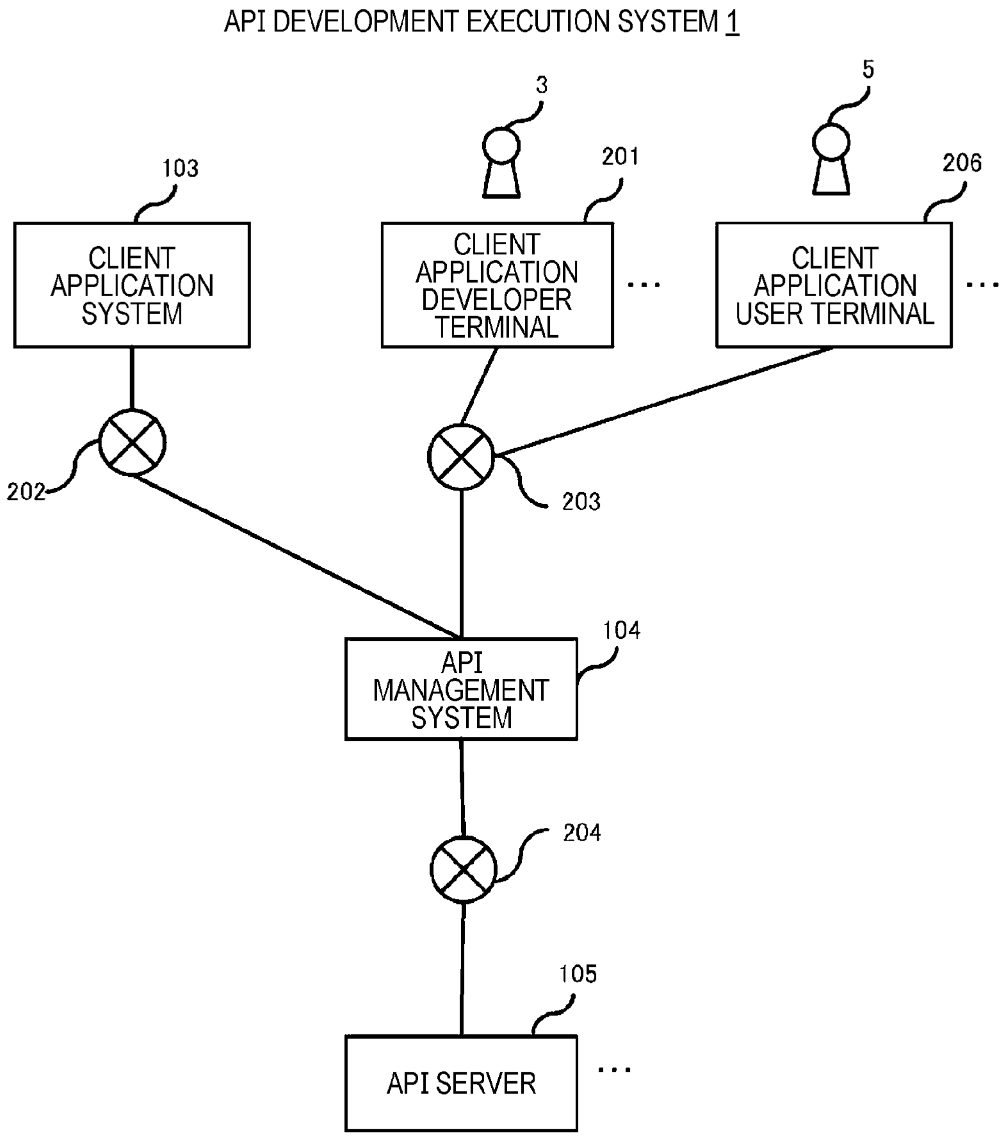
FIG. 1 is a diagram illustrating an example of a configuration of an API development execution system according to Embodiment 1.

FIG. 1 is a diagram illustrating an example of a configuration of an API development execution system 1 according to Embodiment 1. The API development execution system 1 includes an API server 105, a client application developer terminal 201, a client application user terminal 206, a client application system 103, and an API management system 104. The API server 105 stores a program (application programming interface (API)) for realizing various functions. The client application developer terminal 201 is used by a developer 3 who develops an application (client application) using the API of the API server 105. The client application user terminal 206 is used by a user 5 who uses (executes) the developed client application. The client application system 103 is called from the client application developer terminal 201 and the client application user terminal 206 and requests the API server 105 to execute each API designated by the client application. The API management system 104 is called from the client application system 103 and manages a communication scheme of data communication related to the API with the API server 105.

The client application developer terminal 201 and the client application user terminal 206 are communicably connected to an API management system 104 via a communication network 203. The client application system 103 is communicably connected to the API management system 104 via a communication network 202. The API server 105 is connected to the API management system 104 via a communication network 204.

The communication networks 202, 203, and 204 are, for example, wired or wireless communication networks such as a local area network (LAN), a wide area network (WAN), the Internet, or a dedicated line.

Note that a plurality of client application systems 103, a plurality of client application developer terminals 201, a plurality of client application user terminals 206, and a plurality of API servers 105 may be provided.

Figure 2:
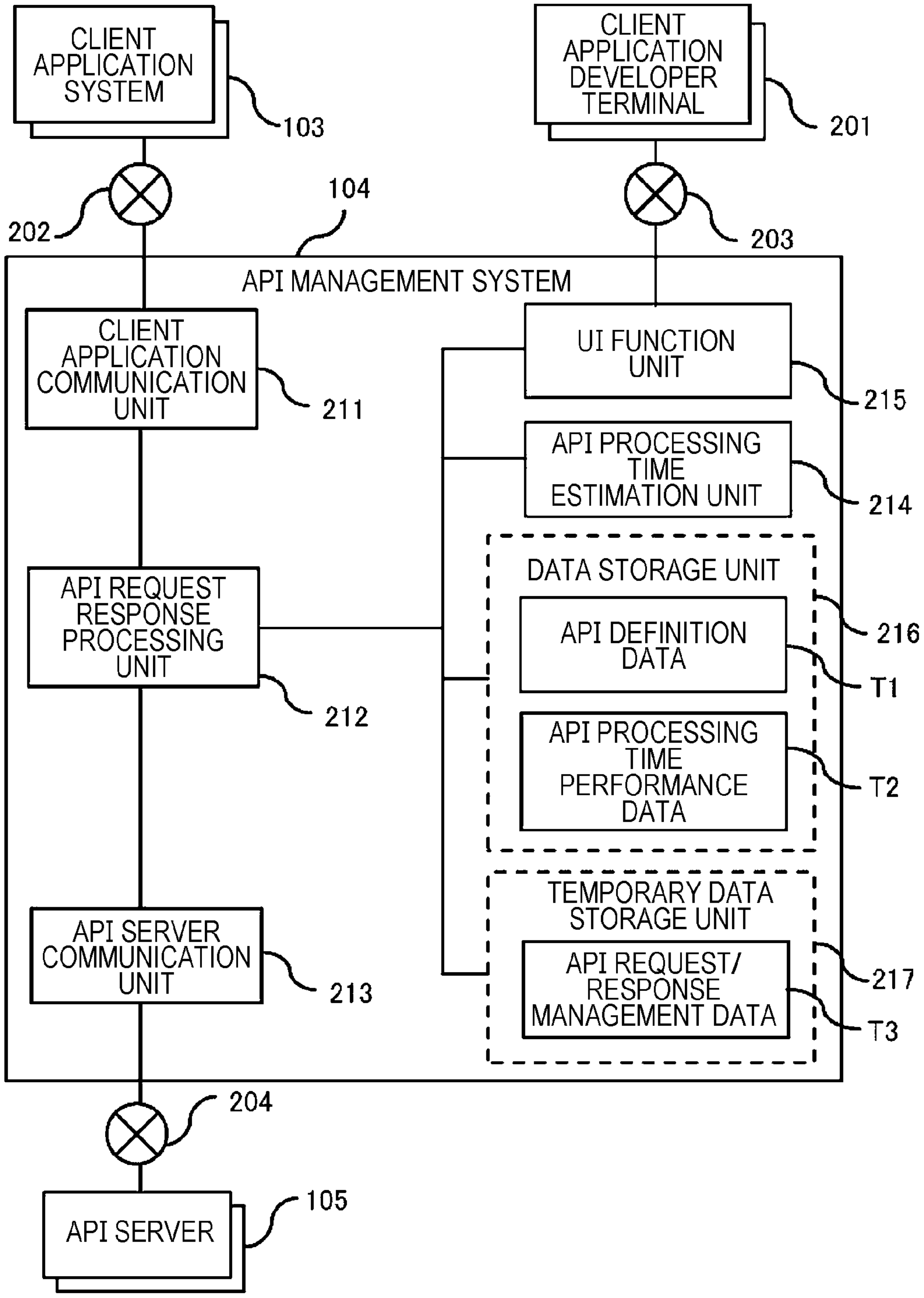
FIG. 2 is a diagram illustrating functions of an API management system.

Next, FIG. 2 is a diagram illustrating functions of the API management system 104. The API management system 104 is an information processing apparatus including functional units of a client application communication unit 211, an API request/response processing unit 212, an API server communication unit 213, an API processing time estimation unit 214, a UI function unit 215, a data storage unit 216, and a temporary data storage unit 217.

The client application communication unit 211 transmits and receives a processing request (API request) related to an API and a processing response (API response) to the processing request, between the client application system 103 and the API management system 104.

For example, the client application communication unit 211 receives an API request from the client application system 103. The received API request is transferred to the API request/response processing unit 212.

Furthermore, for example, the client application communication unit 211 receives an API response from the API request/response processing unit 212, and transmits the received API response to the client application system 103.

Note that, in the present embodiment, it is assumed that the client application communication unit 211 is implemented to be able to transmit and receive an API request and an API response to and from the client application system 103 in a plurality of types of communication protocols such as the synchronous or asynchronous hyper text transfer protocol (HTTP) and asynchronous Websocket.

The API server communication unit 213 transmits and receives an API request and an API response between the API management system 104 and the API server 105.

For example, the API server communication unit 213 receives an API request from the API request/response processing unit 212 and transmits the received API request to the API server 105.

Furthermore, for example, the API server communication unit 213 receives an API response from the API server 105, and transfers the received API response to the API request/response processing unit 212.

Note that, in the present embodiment, it is assumed that the API server communication unit 213 is implemented to be able to transmit and receive an API request and an API response to and from the API server 105 in a plurality of types of communication protocols such as the synchronous or asynchronous hyper text transfer protocol (HTTP) and asynchronous Websocket.

Next, the API request/response processing unit 212 realizes conversion of a communication scheme of communication performed with the client application system 103 or the API server 105 (conversion between synchronous and asynchronous communication, and the like).

That is, the API request/response processing unit 212 modifies an API request and an API response transmitted and received between the client application system 103 and the API management system 104, and between the API management system 104 and the API server 105 by referring to API definition data T1 and API request/response management data T3. In the API definition data T1, information regarding the specification (for example, formats of the API request and the API response, and characteristic parameters of the API request and the API response) of each API is set. In the API request/response management data T3, the order (for example, the processing order related to the API request and the API response) of various types of processing related to the API is defined.

For example, the API request/response processing unit 212 determines a communication scheme of data communication performed in response to an API request or an API response, based on information of the API request or the API response received from the client application communication unit 211 or the API server communication unit 213. Then, the API request/response processing unit 212 generates a new API request or API response as necessary based on the determined communication scheme, and transfers the generated API request or API response to the client application communication unit 211 or the API server communication unit 213. Then, the transferred API request or API response is transmitted to the client application system 103 or the API server 105.

Note that the API request/response processing unit 212 updates the API request/response management data T3 in accordance with the result of this processing.

In addition, the API request/response processing unit 212 transfers an API response including a processing result in the API server 105 to the client application communication unit 211, and then updates API processing time performance data T2 in which a history of processing related to an API request and an API response is stored.

Here, the API definition data T1, the API processing time performance data T2, and the API request/response management data T3 will be described.

(API Definition Data)

FIG. 3 is a diagram illustrating an example of the API definition data T1. The API definition data T1 includes data items of an API ID 811 which is an identifier of an API, API definition data 812 for API server communication, which is information of a specification related to the API server 105 in the specification of the API, API definition data 813 for client application communication, which is information of a specification related to the API management system 104 in the specification of the API, and a request feature amount 814 for API processing time estimation, which is a feature amount used to estimate a processing time of the API. These types of information are stored for each endpoint URL of the API server 105 in the API request and each method of the API request.

The API definition data 812 for API server communication is a data item related to the API request and the API response. Specifically, the API definition data 812 for API server communication includes data items of a request type 821 which is a type of the API request, a request format 822 which is information of a format of the API request, a response format 823 which is information of a format of an API response corresponding to the API request, and an asynchronous processing identifier 824 related to information of an identifier (referred to below as an asynchronous processing identifier) used in a case where a communication scheme related to the API request and the API response is the asynchronous scheme.

In the request type 821, information of an API request related to a communication scheme (synchronous HTTP, asynchronous HTTP, or asynchronous Websocket method) that can be accepted by the API server 105 is set.

For example, in the case of the asynchronous HTTP method, information of an API request (asynchronous HTTP API request) related to the asynchronous HTTP is set in the request type 821. Specifically, in the request type 821, information indicating whether the API request is an asynchronous: request (processing request API request) for a processing request or an asynchronous HTTP API request (processing progress confirmation API request) for processing progress confirmation is set.

Furthermore, in the case of the synchronous HTTP method, information indicating that the API request is an API request (synchronous HTTP API request) of the synchronous HTTP method is set in the request type 821.

Furthermore, in the case of the asynchronous Websocket method, information indicating that the API request is a request for a processing request (asynchronous Websocket processing request API request) is set in the request type 821.

Next, information of a format (for example, a header, an endpoint URL, a method, a payload, or other parameters) of the API request to the API server 105 is set in the request format 822.

Information of a format (for example, a status code or other parameters) of the API response from the API server 105 to the API request is set in the response format 823. The information of the format of the API response is set for each type of the API response to the API request (for example, a processing incompletion API response (API response indicating that the processing of the API is incomplete) or a processing completion API response (API response indicating that the processing of the API has been completed) to a processing progress confirmation API request).

In a case where the type of the asynchronous (for example, asynchronous HTTP or asynchronous Websocket) API request is set in the request type 821, that is, in a case where the communication scheme that can be accepted by the API server 105 is the asynchronous scheme, information of the asynchronous processing identifier is set in the asynchronous processing identifier 824. Specifically, an identifier (asynchronous processing identifier) of the API processing executed by the API server 105 in the format related to the request format 822 or the response format 823 is set in the asynchronous processing identifier 824.

Note that the reason why the asynchronous processing identifier is required is that, in the case of asynchronous communication, a plurality of types of API processing may be performed in parallel by the API server 105. For example, when receiving an API response including the processing result of the API from the API server 105, the API management system 104 needs to determine which API processing result the API response is among a plurality of types of API processing currently performed in the API server 105. At this time, the API management system 104 refers to the asynchronous processing identifier in the asynchronous processing identifier 824.

Next, information regarding an API request transmitted from the client application system 103 to the API management system 104 is set in the API definition data 813 for client application communication. That is, the API definition data 813 for client application communication includes data items of a path 825 and a request method 826.

An API path designated when the client application system 103 transmits an API request to the API management system 104 is set in the path 825. For example, a character string given to an endpoint URL of an API response is set in the path 825 (the character string is given, for example, after the host name of the API management system 104).

In the request method 826, a method (POST, GET, and the like) in an asynchronous or synchronous HTTP API request (for example, a synchronous HTTP API request, a processing request API request, or an asynchronous Websocket processing request API request) from the client application system 103 to the API management system 104 is set.

A feature amount for the API processing time estimation unit 214 to estimate the API processing time is set in the request feature amount 814 for API processing time estimation. For example, the content, the parameter, or the like of the API request is set as the feature amount. Note that the request feature amount 814 for API processing time estimation may include the total amount of data included in the API request, a request time point, or the like.

(API Processing Time Performance Data)

FIG. 4 is a diagram illustrating an example of the API processing time performance data T2. The API processing time performance data T2 includes data items of a request ID 911 of an API request, a client application ID 912 which is an ID of the client application system 103, an API ID 811 which is an ID of an API, an API processing start time point 913 which is a start time point of API processing, an API processing end time point 914 which is an end time point of the API processing, and a performance value 915 of the feature amount for estimating a processing time of the API processing.

An ID of a synchronous HTTP API request or a processing request API request related to asynchronous HTTP from the client application system 103 is set in the request ID 911. Note that an ID of a processing progress confirmation API request related to the asynchronous HTTP is not set in the request ID 911.

An identifier of the client application system 103 that is a request source of the API is set in the client application ID 912.

An ID of the API is set in the API ID 811, similar to the API definition data T1.

A time point at which the API processing has been started is set in the API processing start time point 913. For example, the API processing start time point 913 is set with a time point at which the API management system 104 has transmitted the synchronous HTTP API request or the asynchronous HTTP API request to the API server 105.

A time point at which the API processing has been ended is set in the API processing end time point 914. For example, a time point at which the API management system 104 has received an API response (synchronous HTTP API response) to a synchronous HTTP API request or an API response (processing completion API response) to an asynchronous HTTP API request or an asynchronous Websocket processing request API request (indicating processing completion) from the API server 105 is set in the API processing end time point 914.

As described above, the API processing time performance data T2 stores the relationship between the feature amount related to the API request and the required time (API processing time) related to the execution of the API.

(API Request/Response Management Data)

FIG. 5 is a diagram illustrating an example of the API request/response management data T3. The API request/response management data T3 includes data items of a request ID 911, a client application ID 912, an API ID 811, an API processing start time point 913, a communication scheme 1011, a performance value 915, an asynchronous processing identifier 1012, and a current processing status 1013.

The request ID 911, the client application ID 912, the API ID 811, the API processing start time point 913, and the performance value 915 are similar to the data items of the API processing time performance data T2.

Information (for example, synchronous HTTP, asynchronous Websocket, asynchronous HTTP) of the communication scheme adopted by the client application system 103 is set in the communication scheme 1011.

Information of an identifier (asynchronous processing identifier) of an API request or an API response in a case where the API management system 104 performs asynchronous communication with the API server 105 or the client application system 103 is set in the asynchronous processing identifier 1012 (corresponding to the asynchronous processing identifier 824 of the API definition data T1).

Specifically, in a case where the API management system 104 has a configuration of communicating with the API server 105 in an asynchronous method, the information of the asynchronous processing identifier of an API request and an API response transmitted and received therebetween is set in the asynchronous processing identifier 1012.

Furthermore, in a case where the API management system 104 has a configuration of communicating with the client application system 103 in an asynchronous scheme, an asynchronous processing identifier of an API request and an API response transmitted and received therebetween is set in the asynchronous processing identifier 1012.

Information of the processing status of the current processing in the API management system 104 is set in the current processing status 1013. Note that, in a case where the communication scheme between the API management system 104 and the API server 105 is the synchronous scheme, and the API management system 104 receives an API response including the processing result of the API from the API server 105, the content of the API response is set in the current processing status 1013.

The API processing time estimation unit 214 acquires information regarding an API called from a client application, which has been received from the client application developer terminal 201 or the like operated by a developer 3 who develops the client application using the API (referred to below as an assumed request. Information having a content similar to the API request). Furthermore, the API processing time estimation unit 214 acquires a constraint condition (simply referred to below as a constraint condition) regarding an API call provided in the client application system 103.

Then, the API processing time estimation unit 214 estimates a required time required for processing of the API (API processing time), which is specified by the assumed request. Furthermore, a the API processing time estimation unit 214 determines communication scheme to be proposed to the client application developer 3 based on the estimated API processing time.

Specifically, the API processing time estimation unit 214 receives an assumed request (including, for example, information of the communication scheme and information of the type and contents of processing performed by the API) from the UI function unit 215, and estimates the API processing time based on the received assumed request and the API processing time performance data T2. Then, based on the estimated API processing time, the constraint condition received from the UI function unit 215, and the like, the API processing time estimation unit 214 generates information (referred to below as communication scheme proposal information) of proposal of the communication scheme to the developer 3. Such information indicates which of the synchronous and asynchronous communication schemes is appropriate as the communication scheme in the communication with the API server 105.

The UI function unit 215 provides a user interface (UI) for the client application developer terminal 201.

For example, the UI function unit 215 transmits, to the client application developer terminal 201, an input screen for accepting an input of an assumed request and a constraint condition from the developer 3. In addition, the UI function unit 215 receives the assumed request and the constraint condition input to the input screen and transfers the assumed request and the constraint condition to the API processing time estimation unit 214. Note that the constraint condition of the client application system 103 may not be an essential item of the input.

Furthermore, for example, the UI function unit 215 receives the estimated value of the API processing time and the information of the proposal of the communication scheme to the developer 3 (communication scheme information) from the API proposal processing time estimation unit 214, and transmits a screen displaying the received information to the client application developer terminal 201.

The data storage unit 216 stores the API definition data T1 and the API processing time performance data T2.

The temporary data storage unit 217 temporarily stores the API request/response management data T3.

Figure 6:
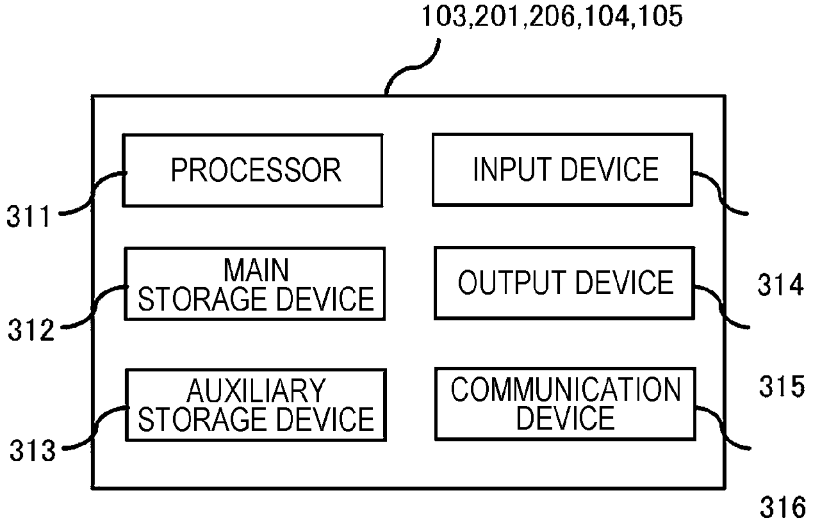
FIG. 6 is a diagram illustrating an example of hardware provided in each information processing apparatus.

Here, FIG. 6 is a diagram illustrating an example of hardware provided in each information processing apparatus of the API management system 104, the client application system 103, the client application developer terminal 201, the client application user terminal 206, and the API server 105. As illustrated in FIG. 6, each information processing apparatus includes a processor 311, a main storage device 312, an auxiliary storage device 313, an input device 314, an output device 315, and a communication device 316.

Each information processing apparatus may be realized by using a virtual information processing resource such as a cloud server provided by a cloud system, for example. Furthermore, for example, each information processing apparatus may be realized by a plurality of information processing apparatuses that operate in cooperation.

The processor 311 is configured by using, for example, a central processing unit (CPU), a micro processing unit (MPU), a graphics processing unit (GPU), or the like. The main storage device 312 is a device that stores programs and data. The main storage device 312 is, for example, a read only memory (ROM) (a mask read only memory (mask ROM), a programmable ROM (PROM), and the like), a random access memory (RAM) (a static random access memory (SRAM), a non-volatile RAM (NVRAM), a dynamic random access memory (DRAM) and the like), and the like. The auxiliary storage device 313 is a hard disk drive, a flash memory, a solid state drive (SSD), an optical storage device (a compact disc (CD), a digital versatile disc (DVD), and the like), and the like. The program and data stored in the auxiliary storage device 313 are read into the main storage device 312 as needed.

The input device 314 is a UI that receives information from the user, and is, for example, a keyboard, a mouse, a card reader, a touch panel, and the like. The output device 315 is a UI that provides information for the user by outputting information (display-output, sound-output, printing-output, or the like). For example, the output device 315 is a display device (a liquid crystal display (LCD), a graphic card, and the like) that visualizes various types of information, an audio output device (speaker), a printing device, and the like. The communication device 316 is a communication interface that communicates with another device via a communication network, and is, for example, a network interface card (NIC), a wireless communication module, a universal serial interface (USB) module, a serial communication module, and the like. The communication device 316 can also function as an input device that receives information from another device communicably connected. Furthermore, the communication device 316 can also function as an output device that transmits information to another device communicably connected.

The function of each information processing apparatus is implemented by the processor 311 reading and executing a program stored in the main storage device 312 or the auxiliary storage device 313. In addition, the program can be recorded on a recording medium and distributed, for example.

In addition to the above functions, for example, each information processing apparatus may further include other functions such as an operating system, a file system, a device driver, and a database management system (DBMS). Each information processing apparatus stores various types of information (data) as, for example, a table or a file of a database.

Next, processing performed by the API development execution system 1 will be described.

Outline of Processing

Figure 7:
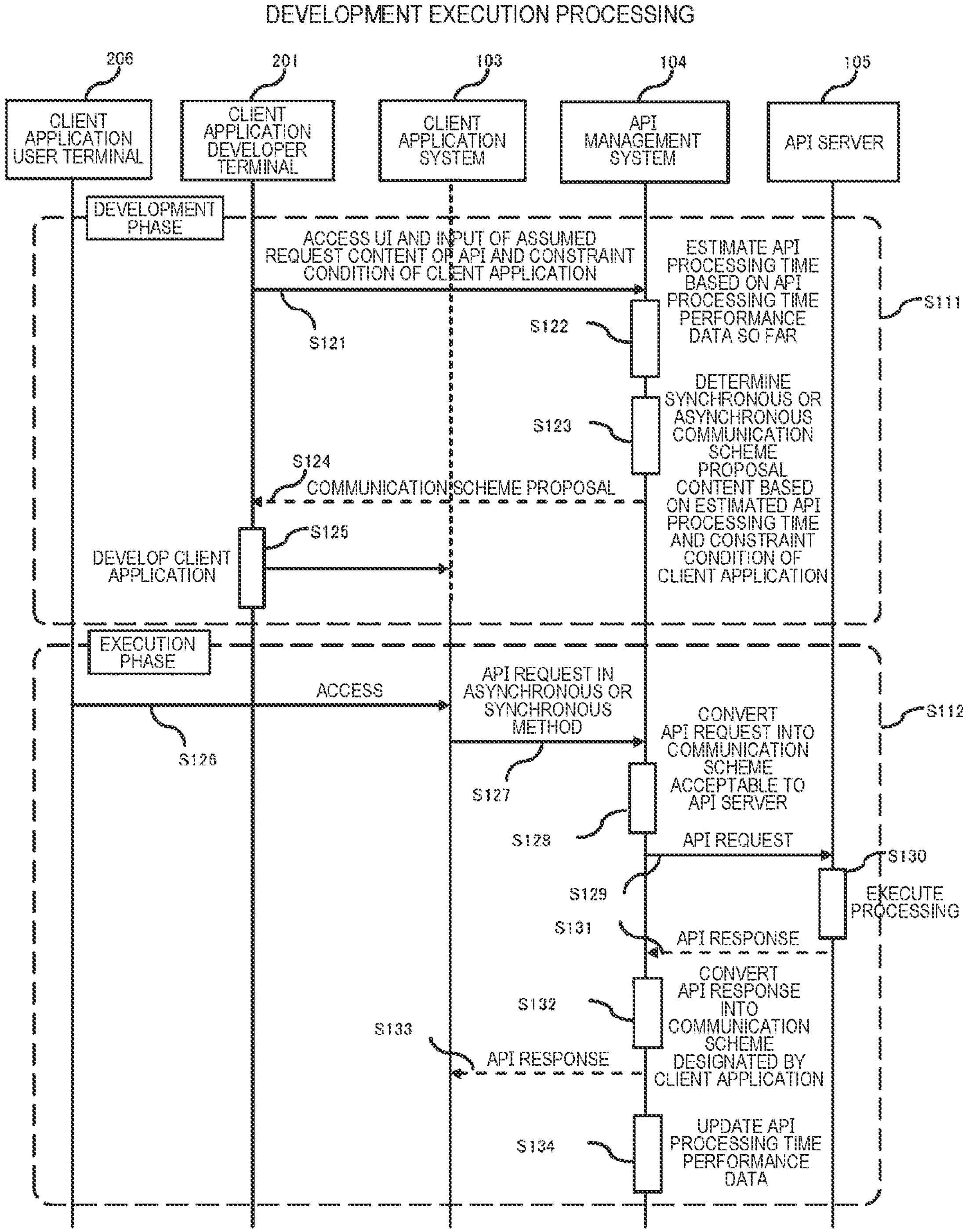
FIG. 7 is a sequence diagram illustrating an outline of development execution processing.

FIG. 7 is a sequence diagram illustrating an outline of processing (development execution processing) performed by the API development execution system 1.

The development execution processing includes a development phase S111 that is processing in which the developer 3 of the client application develops a client application, and an execution phase S112 that is processing in which the client application developed in the development phase S111 is executed.

(Development Phase)

First, the development phase S111 will be described. The development phase S111 is executed, for example, when a predetermined start input is performed to the client application developer terminal 201.

First, the API management system 104 accepts an assumed request and an input of a constraint condition from the client application developer terminal 201 (Step S121). For example, the API management system 104 causes the client application developer terminal 201 to display a predetermined input screen as a user interface (UI), and accepts the input of the assumed request and the constraint condition from the developer 3. Note that the constraint condition may be freely input.

Note that the assumed request is, for example, a value of a parameter included in the API request, a value of a total data amount included in the API request, an API request time point, an API request frequency, or the like.

Further, the constraint condition is, for example, a timeout time of an HTTP connection in the client application system 103, the maximum number of HTTP connections that can be simultaneously held from the client application system 103 to a single host, and the like. In addition, in a case where the client application system 103 transmits an API request in a state where the number of HTTP connections (for example, the number of HTTP connections from the client application system 103 to the API management system 104) has reached the maximum number of connections in the client application system 103, a time (maximum execution waiting time t*wait) during which the client application system 103 can wait until the number of connections of the HTTP connection becomes available may be included in the constraint condition.

The API management system 104 estimates the API processing time corresponding to the assumed request input in Step S121 based on the API processing time performance data T2 (Step S122).

The API management system 104 determines whether the client application system 103 is to perform an API request by using the synchronous or asynchronous communication scheme, based on the API processing time estimated in Step S122 (Step S123). That is, the API management system 104 generates communication scheme proposal information.

The API management system 104 transmits the communication scheme proposal information generated in Step S123 to the client application developer terminal 201 (Step S124). For example, the API management system 104 displays the content of the communication scheme proposal information on the screen of the client application developer terminal 201. Note that the communication scheme proposal information includes information such as an estimated value of the API processing time.

The client application developer terminal 201 generates a client application in which a communication scheme is set for each API, based on the input from the developer 3 with reference to the communication scheme proposal information, and stores the generated client application in the client application system 103 (Step S125). For example, the client application developer terminal 201 receives, from the developer 3, an input of codes of the client application according to the communication scheme (synchronous or asynchronous) displayed on the screen. The client application developer terminal 201 transmits the input codes of the client application to the client application system 103.

As described above, in the development phase S111, the API management system 104 proposes, to the developer 3 of the client application, whether the communication scheme of the data communication related to the API called by the client application system 103 is to be asynchronous or synchronous. As a result, the developer 3 of the client application can select the communication scheme that optimizes the development burden of the client application and the resource consumption of the client application system 103. Note that the development phase S111 is repeatedly executed for each API scheduled to be called from the client application that is developed by the developer 3.

(Execution Phase)

Next, the execution phase S112 will be described. First, the client application user terminal 206 requests the client application system 103 to perform processing related to the API in the client application created in the development phase S111 (Step S126). For example, the client application system 103 causes the client application user terminal 206 to display a screen for accepting a processing request related to execution of the API in the client application, and accepts an input of the processing request from the user 5.

The client application system 103 transmits an API request to the API management system 104 in order to execute processing requested from the client application user terminal 206 (Step S127).

Note that the communication scheme related to the transmission of the API request may be either an asynchronous scheme or a synchronous scheme. Note that this API request includes information of the communication scheme used between the client application system 103 and the API management system 104.

The API management system 104 converts the API request received from the client application system 103 into an API request of a communication scheme acceptable to the API server 105 as necessary (Step S128), and transmits the converted API request to the API server 105 (Step S129).

When receiving this API request, the API server 105 executes processing (for example, execution of the API) according to the API request (Step S130). When the processing is completed, the API server 105 transmits an API response including information on the processing result to the API management system 104 (Step S131).

The API management system converts the API response received from the API server 105 into the API response of the communication scheme indicated by the API request received in Step S127 (Step S132), and transmits the converted API response to the client application system 103 (Step S133).

The API management system 104 associates the processing time related to the API of the API server 105 in Step S130, which is calculated based on the API response received from the API server 105, with the API request or the like received from the client application system 103 in Step S127. Then, the API management system 104 stores the result of the association in the API processing time performance data T2 (Step S134).

The stored data is used in the development phase S111 to be executed hereinafter. For example, the API management system 104 estimates the API processing time by using the stored data in Step S122 of the development phase S111, and thus causes the estimation accuracy to be improved. Further, the API management system 104 proposes an accurate communication scheme to the developer 3 by creating the communication scheme proposal information by using the stored data. Details thereof will be described later.

As described above, in the execution phase S112, the client application user terminal 206 accesses the client application system 103 and requests execution of the API, and the client application system 103 executes the API provided by the API server 105 via the API management system 104 in response to the request. At this time, the API management system 104 mutually converts the synchronous and asynchronous communication schemes as necessary for the accesses from the client application system 103 and the API management system 104.

That is, in the execution phase S112, since the API management system 104 mutually converts the synchronous and asynchronous communication schemes as necessary, the client application system 103 can use both the synchronous and asynchronous communication schemes, for example, even in a case where the API server 105 supports only one of the synchronous and asynchronous communication schemes.

Note that, here, there are various patterns in combinations of communication schemes between the client application system 103 and the API management system 104 and between the API management system 104 and the API server 105. For example, the client application system 103 and the API management system 104 may use the asynchronous HTTP method, and the API management system 104 and the API server 105 may use the synchronous HTTP method. Further, the client application system 103 and the API management system 104 may use the synchronous HTTP method, and the API management system 104 and the API server 105 may use the asynchronous HTTP method. In addition, all the client application system 103 and the API management system 104, and the API management system 104 and the API server 105 may use the synchronous HTTP method or the asynchronous HTTP method. In addition, a protocol capable of bidirectional communication such as Websocket may be used as the protocol of the asynchronous communication scheme. Specific examples thereof will be described later.

Execution Phase

Next, an outline of the execution phase S112 will be described according to communication schemes of the client application system 103, the API management system 104, and the API server 105.

(Case of Asynchronous HTTP-Synchronous HTTP)

Figure 8:
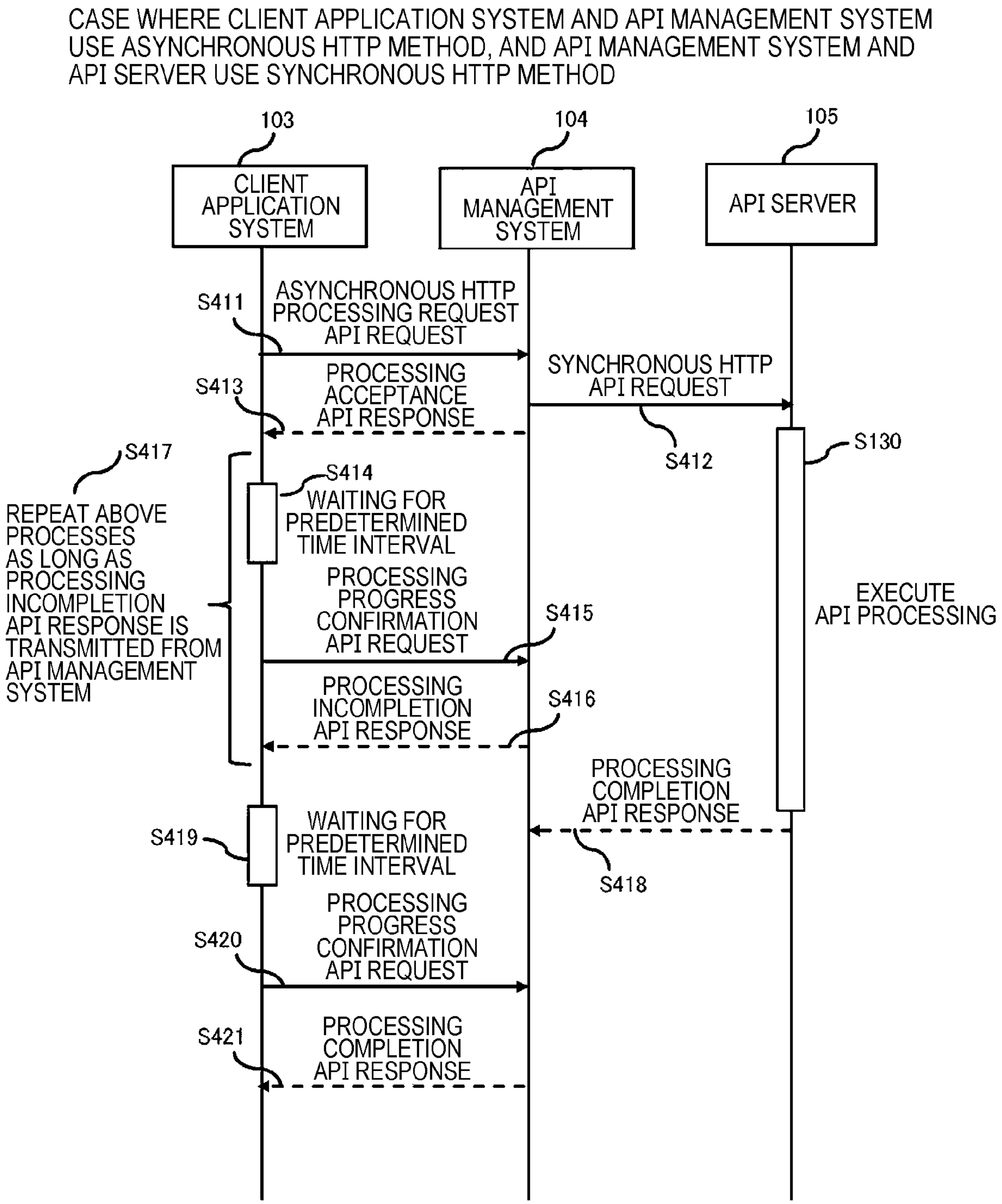
FIG. 8 is a sequence diagram illustrating an outline of an execution phase in a case where a client application system and the API management system use an asynchronous HTTP method, and the API management system and an API server use a synchronous HTTP method.

FIG. 8 is a sequence diagram illustrating an outline of the execution phase S112 in a case where the client application system 103 and the API management system 104 use an asynchronous HTTP method, and the API management system 104 and the API server 105 use a synchronous HTTP method.

First, the client application system 103 transmits a processing request API request (processing request API request related to asynchronous HTTP) to the API management system 104 (Step S411). Note that the processing request API request includes information indicating a communication scheme related to the processing request API request (information indicating that the asynchronous HTTP method is used as the communication scheme), information indicating that the processing request API request is an API processing request, and the client application ID of the client application system 103.

The API management system 104 determines that the asynchronous HTTP method is used as the communication scheme based on the processing request API request received from the client application system 103. Then, the API management system 104 converts the processing request API request into a synchronous HTTP API request, and transmits the synchronous HTTP API request to the API server 105 (Step S412).

The API server 105 starts API processing based on the received synchronous HTTP API request (Step S130). On the other hand, the API management system 104 transmits, to the client application system 103, a processing acceptance API response which is an API response indicating that the acceptance for the processing request API request in Step S411 has been completed (Step S413). Note that, since the client application system 103 and the API management system 104 perform asynchronous communication, the processing acceptance API response includes the asynchronous processing identifier.

Thereafter, when the API processing is completed, the API server 105 transmits a processing completion API response indicating that the API processing has been completed and including the processing result thereof, to the API management system 104 (Step S418).

On the other hand, after the API request is transmitted in Step S411, the client application system 103 repeatedly transmits a processing progress confirmation API request to the API management system 104 every predetermined time (Step S414, Step S419) (Step S415, Step S420). Note that the processing progress confirmation API request includes information indicating that the processing progress confirmation API request is for processing progress confirmation of the API, a client application ID of the client application system 103, and the asynchronous processing identifier in the processing acceptance API response received in Step S413.

In a case where the API management system 104 has received the processing progress confirmation API request from the client application system 103, the API management system 104 confirms whether or not a processing completion API response is received from the API server 105. In a case where the processing completion API response is not received from the API server 105, the API management system 104 transmits a processing incompletion API response to the client application system 103 (Step S416). On the other hand, in a case where the processing completion API response is received from the API server 105, the API management system 104 transmits the processing completion API response to the client application system 103 (Step S421).

Note that Steps S414, S415, and S416 are repeatedly performed until the API management system 104 receives the processing completion API response (polling, Step S417).

(Case of Synchronous HTTP-asynchronous HTTP)

Figure 9:
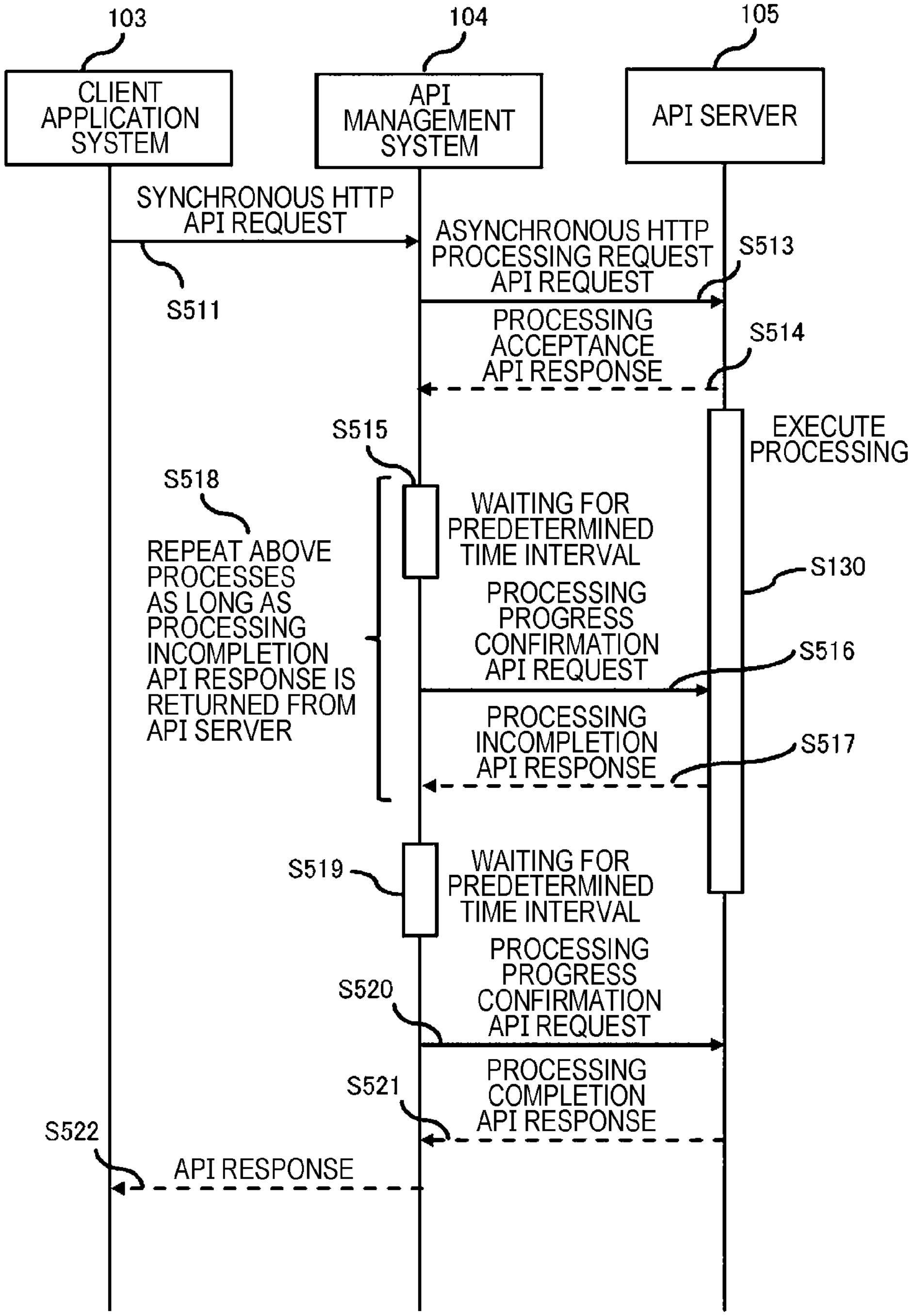
FIG. 9 is a sequence diagram illustrating an outline of an execution phase in a case where the client application system and the API management system use the synchronous HTTP method, and the API management system and the API server use the asynchronous HTTP method.

FIG. 9 is a sequence diagram illustrating an outline of the execution phase in a case where the client application system 103 and the API management system 104 use the synchronous HTTP method, and the API management system 104 and the API server 105 use the asynchronous HTTP method.

The client application system 103 transmits a synchronous HTTP API request to the API management system 104 (Step S511). Note that the synchronous HTTP API request includes information of the communication scheme related to the synchronous HTTP API request (information indicating synchronous HTTP) and the client application ID of the client application system 103.

The API management system 104 determines that the synchronous HTTP method is used as the communication scheme based on the synchronous HTTP API request received from the client application system 103. Then, the API management system 104 converts the synchronous HTTP API request into a processing request API request related to the asynchronous HTTP, and transmits the processing request API request to the API server 105 (Step S513).

The API server 105 starts processing of the corresponding API based on the received processing request API request (Step S130). In addition, the API server 105 transmits, to the API management system 104, a processing acceptance API response indicating that acceptance for the processing request API request has been completed (Step S514).

After the processing request API request in Step S513 is transmitted, the API management system 104 repeatedly transmits a processing progress confirmation API request to the API server 105 every predetermined time (Step S515, Step S519) (Step S516).

In a case where the API server 105 has received the processing progress confirmation API request from the API management system 104, the API server 105 confirms whether or not the API processing is completed. In a case where the API processing is not completed, the API server 105 transmits a processing incompletion API response indicating that the processing is not completed, to the API management system 104 (Step S517).

Steps S515, S516, and S517 are repeatedly performed as long as the processing incompletion API response is transmitted from the API server 105 (polling, Step S518).

In a case where the processing of the API has been completed and the processing progress confirmation API request has been received from the API management system 104 (Step S520), the API server 105 transmits a processing completion API response including the processing result of the API to the API management system 104 (Step S521).

When receiving the processing completion API response from the API server 105, the API management system 104 transmits an API response including information of the processing result of the API added to the processing completion API response, to the client application system 103 (Step S522).

(Case of Asynchronous Bidirectional Communication Scheme-Synchronous HTTP Method)

Figure 10:
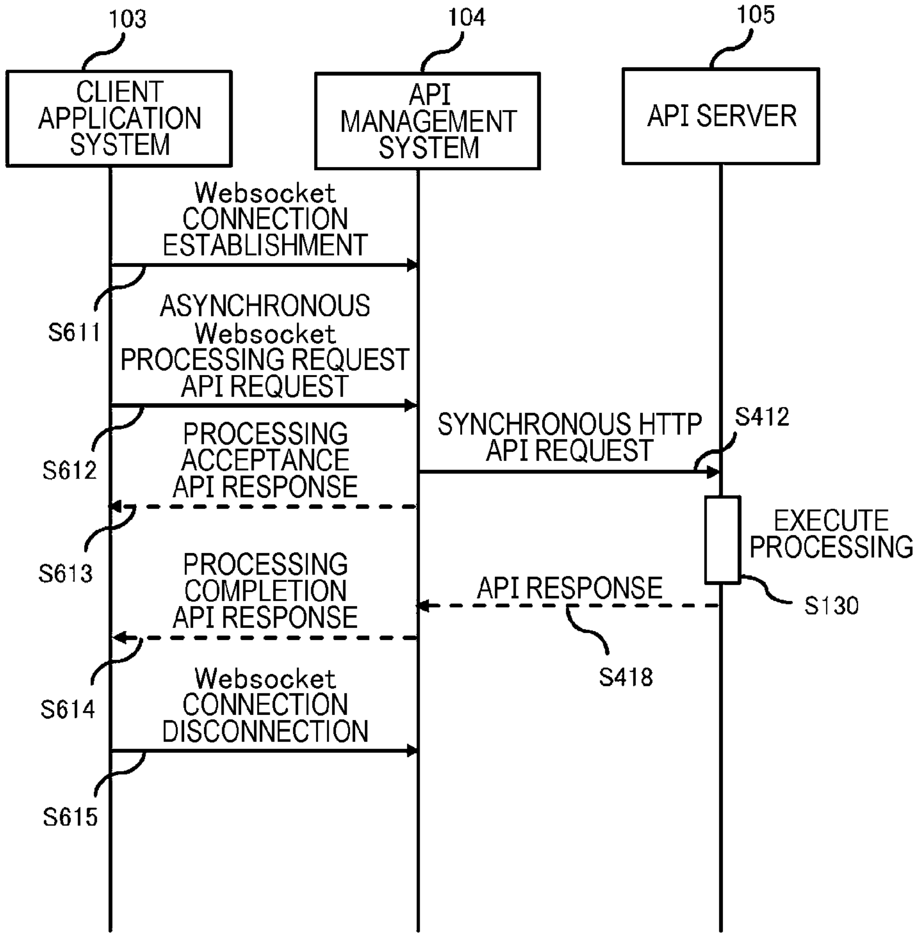
FIG. 10 is a sequence diagram illustrating an outline of an execution phase in a case where the client application system and the API management system use an asynchronous bidirectional method, and the API management system and the API server use the synchronous HTTP method.

FIG. 10 is a sequence diagram illustrating an outline of the execution phase S112 in a case where the client application system 103 and the API management system 104 use an asynchronous bidirectional method, and the API management system 104 and the API server 105 use the synchronous HTTP method. Here, it is assumed that the asynchronous bidirectional communication scheme is Websocket.

The client application system 103 transmits a request for establishing a Websocket connection to the API management system 104 (Step S611). Note that this request includes the client application ID of the client application system 103. Furthermore, in a case where there is an already established connection between the client application system 103 and the API management system 104, Step S611 may be omitted.

Subsequently, the client application system 103 transmits an asynchronous Websocket processing request API request related to the API to be executed, to the API management system 104 (Step S612).

The API management system 104 determines that the synchronous HTTP method is used as the communication scheme, based on the received asynchronous Websocket processing request API request. Then, the API management system 104 converts the asynchronous Websocket processing request API request into a synchronous HTTP API request, and transmits the synchronous HTTP API request (Step S412).

In addition, the API management system 104 transmits, to the client application system 103, a processing acceptance API response indicating that acceptance for the asynchronous Websocket processing request API request has been completed (Step S613). Note that the processing acceptance API response includes an asynchronous processing identifier.

On the other hand, the API server 105 starts processing of the API based on the processing request API request received from the API management system 104 (Step S130). When the processing of the API is completed, the API server

105 transmits a processing completion API response including the processing result of the API to the API management system 104 (Step S418).

When receiving the API response from the API server 105, the API management system 104 transmits, to the client application system 103, a processing completion API response indicating that the API processing has been completed and including the processing result in the API server 105 (Step S614).

The client application system 103 waits after receiving the processing acceptance API response in Step S613. When receiving the processing completion API response, the client application system 103 disconnects a Websocket connection with the API management system 104 established in Step S611 (Step S615).

(Case of Synchronous HTTP Method-Asynchronous Bidirectional Communication Scheme)

Figure 11:
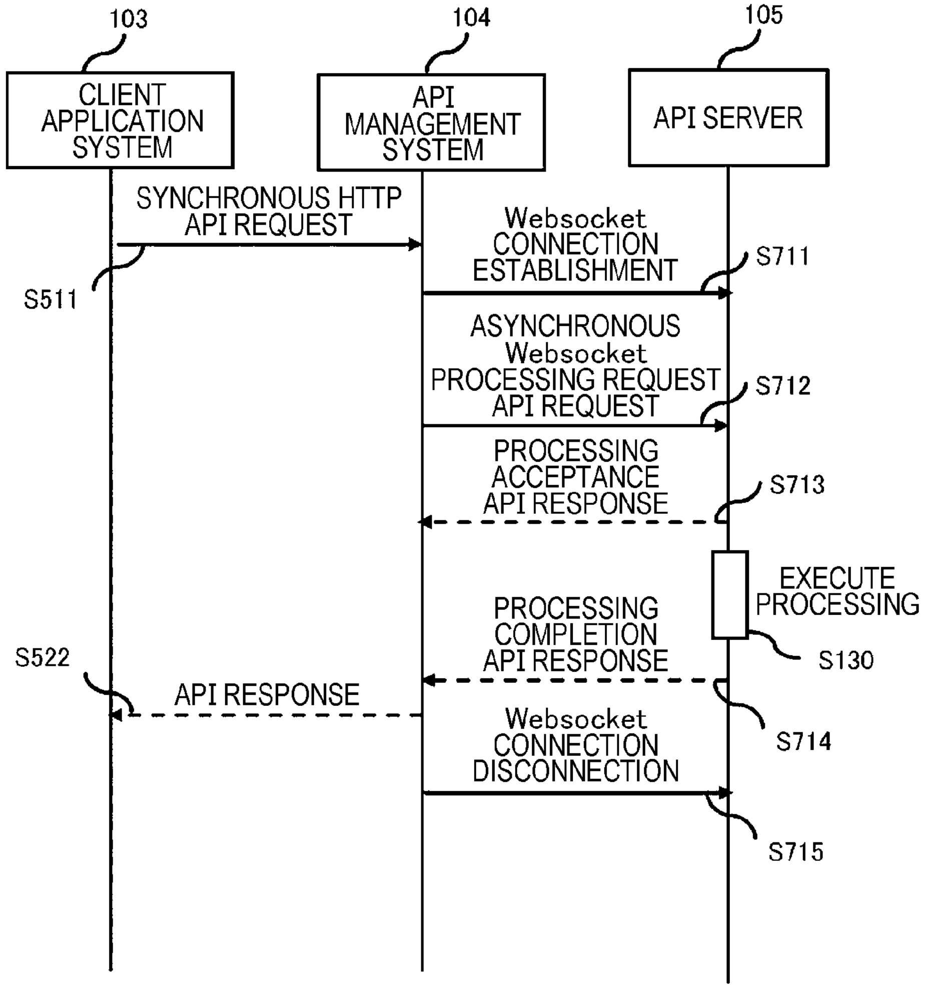
FIG. 11 is a sequence diagram illustrating an outline of an execution phase in a case where the client application system and the API management system use the synchronous HTTP method, and the API management system and the API server use the asynchronous bidirectional method.

FIG. 11 is a sequence diagram illustrating an outline of the execution phase S112 in a case where the client application system 103 and the API management system 104 use the synchronous HTTP method, and the API management system 104 and the API server 105 use the asynchronous bidirectional method. Here, it is assumed that the asynchronous bidirectional communication scheme is Websocket.

The client application system 103 transmits a synchronous HTTP API request to the API management system 104 (Step S511).

When receiving the synchronous HTTP API request from the client application system 103, the API management system 104 transmits a request for establishing a Websocket connection to the API server 105 (Step S711). Note that, in a case where a connection has already been established between the API management system 104 and the API server 105, Step S711 may be omitted.

Then, when the Websocket connection is established, the API management system 104 converts the received synchronous HTTP API request into an asynchronous Websocket processing request API request and transmits the asynchronous Websocket processing request API request to the API server 105 (Step S712).

When receiving the asynchronous Websocket processing request API request from the API management system 104, the API server 105 transmits processing acceptance API response to the API management system 104 (Step S713), and executes processing of the API indicated by the asynchronous Websocket processing request API request (Step S130).

When the processing of the API is completed, the API server 105 transmits a processing completion API response including the processing result of the API to the API management system 104 (Step S714).

When receiving the processing completion API response from the API server 105, the API management system 104 transmits, to the client application system 103, a synchronous HTTP API response indicating that the API processing has been completed and including the processing result of the API added to the processing completion API response (Step S522). Further, the API management system 104 disconnects the Websocket connection with the API server 105, which has been established in Step S711 (Step S715).

Next, details of processing performed by the API management system 104 will be described.

Execution Phase (API Request/Response Processing)

Figure 12:
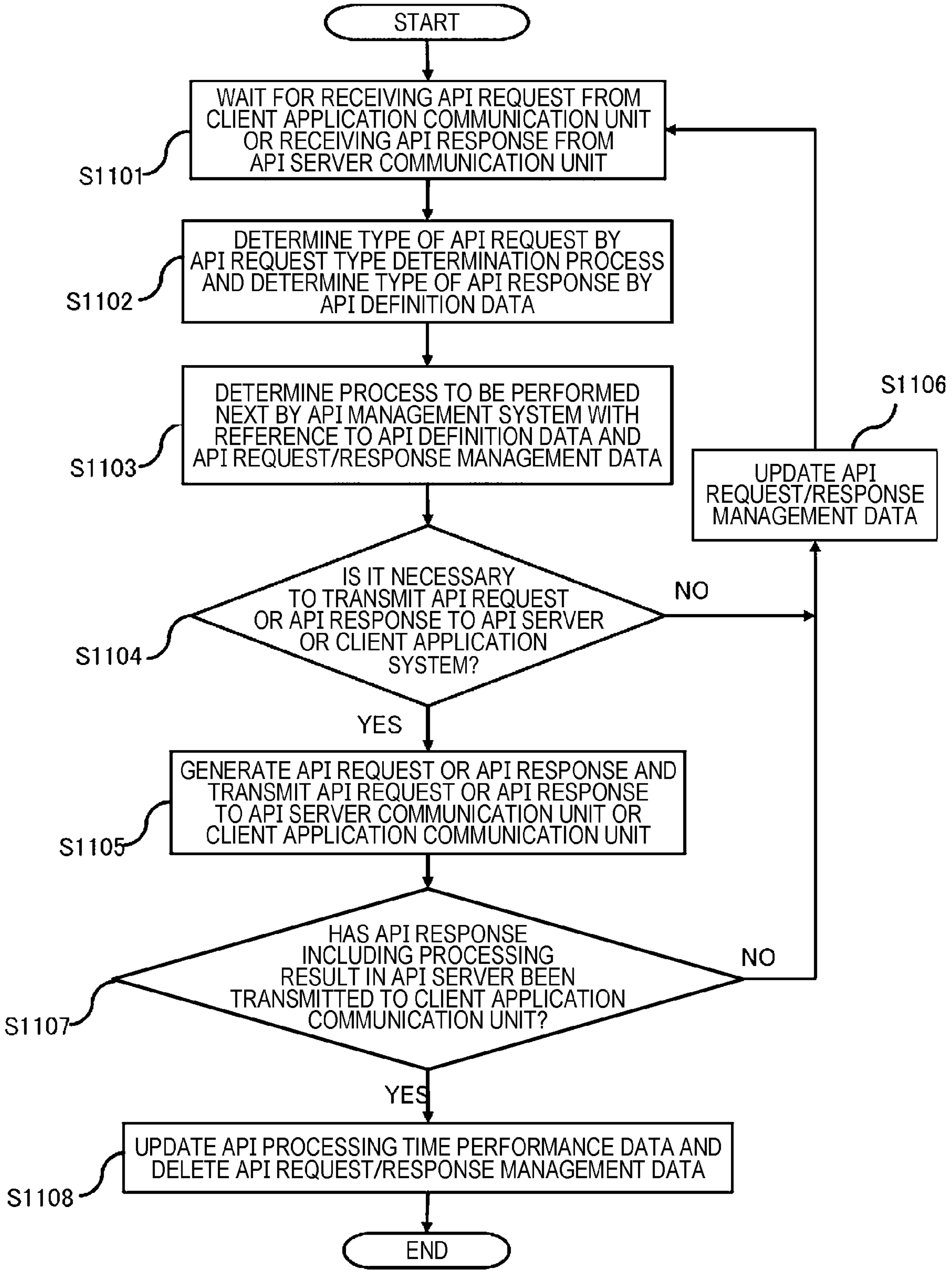
FIG. 12 is a flowchart illustrating an example of API request/response processing.

FIG. 12 is a flowchart illustrating an example of API request/response processing which is processing performed by the API request/response processing unit 212 in the execution phase S112. Note that this API request/response processing may be executed in parallel as a plurality of processes.

The API request/response processing unit 212 waits for reception of an API request or an API response from the client application communication unit 211 and the API server communication unit 213 (Step S1101). That is, the API request/response processing unit 212 waits for reception of the API request or the API response from the API server 105 and the client application system 103.

Then, in a case where the API request/response processing unit 212 has received the API request from the client application communication unit 211, the API request/response processing unit 212 determines the type of the API request based on API request type determination processing to be described later. On the other hand, in a case where the API request/response processing unit 212 has received the API response from the API server communication unit 213, the API request/response processing unit 212 determines the type of the API response with reference to the API definition data T1 (described above, Step S1102).

The API request/response processing unit 212 determines processing to be performed next by the API management system 104 based on the type of the API request or the API response determined in Step S1102, the API definition data T1, and the API request/response management data T3 (Step S1103).

Here, the process of Step S1103 will be described using a specific example.

For example, it is assumed that the API request/response processing unit 212 receives an API request from the client application communication unit 211 in Step S1101 and determines that the type of the API request is a processing progress confirmation API request related to asynchronous HTTP in Step S1102.

In this case, the API request/response processing unit 212 refers to each record in the API request/response management data T3, and specifies a record in which the information of the asynchronous processing identifier included in the received API request is set in the asynchronous processing identifier 1012, and identification information of the client application system 103 as the transmission source of the API request is set in the client application ID 912. Here, it is assumed that a record 1003 in the API request/response management data T3 of FIG. 5 is specified.

The API request/response processing unit 212 specifies that communication between the API management system 104 and the API server 105 is the synchronous HTTP method, with reference to the API ID 811 of the record 1003 and the request type 821 of the corresponding record 801 in the API definition data T1. Specifically, the API request/response processing unit specifies that processing to be performed next is transmission of a synchronous HTTP API response. Note that information indicating that the synchronous HTTP API response has been received from the API server 105 is set in the current processing status 1013 of the record 1003.

As illustrated in the sequence diagram of FIG. 8 (in a case where the client application system 103 and the API management system 104 use the asynchronous HTTP method, and the API management system 104 and the API server 105 use the synchronous HTTP method), for example, in a case where the API management system 104 has received the API response from the API server 105, the processing to be performed next when the API management system 104 has received the processing progress confirmation API request from the client application system 103 is transmission of the processing completion API response including the information of the processing result added to the API response received from the API server 105 to the client application system 103.

As in the above specific example, in Step S1103, the API request/response processing unit 212 determines the processing to be performed next by the API management system 104 with reference to the API definition data T1 and the API request/response management data T3.

Then, the API request/response processing unit 212 determines whether or not the processing to be performed next, which has been specified in Step S1103, is transmission of an API request or an API response to the API server 105 or the client application system 103 (Step S1104).

If the processing to be performed next is the transmission of the API request or the API response to the API server 105 or the client application system 103, the API request/response processing unit 212 executes the process of Step S1105. Furthermore, also in a case where the processing to be performed next is transmission of the API request or the API response after waiting for a predetermined time, the API request/response processing unit 212 executes the process of Step S1105. In other cases, the API request/response processing unit 212 executes the process of Step S1106.

In Step S1105, the API request/response processing unit 212 (after waiting for a predetermined time if necessary) generates an API request or an API response, and transfers the API request or the API response to the API server communication unit 213 or the client application communication unit 211. Then, the API request/response processing unit 212 executes the process of Step S1107.

Note that, as an example in which the API request/response processing unit 212 needs to wait for a predetermined time, there is a case where the communication scheme between the API management system 104 and the API server 105 is the asynchronous HTTP method, and the processing to be performed next by the API management system 104 is transmission of a processing progress confirmation API request to the API server 105 (see Step S515 and Step S516).

Note that, in Step S1105, in a case where the API request/response processing unit 212 transfers the processing acceptance API response related to asynchronous communication to the client application communication unit 211 (see Step S413), the API request/response processing unit 212 issues a new asynchronous processing identifier for the client application system 103, and adds the asynchronous processing identifier to the processing acceptance API response.

Subsequently, the API request/response processing unit 212 determines whether or not the processing completion API response (including the processing result of the API) has been transferred to the client application communication unit 211 in Step S1105 (Step S1107).

In a case where the processing completion API response has been transferred (Step S1107: YES), the API request/response processing unit 212 executes the process of Step S1108. In a case where the processing completion API response has not been transferred (Step S1107: NO), the API request/response processing unit 212 executes the process of Step S1106.

In Step S1106, the API request/response processing unit 212 updates the API request/response management data T3.

For example, in Step S1103, in a case where it is not possible to find a record (record of next processing) related to the API request or the API response received in Step S1102 from the API request/response management data T3, the API request/response processing unit 212 adds a new record to the API request/response management data T3. On the other hand, in a case where the record of the next processing has been found, the API request/response processing unit 212 updates the asynchronous processing identifier 1012 and the current processing status 1013 of this record as necessary (for example, in a case where asynchronous communication is being performed, the asynchronous processing identifier 1012 is updated with the asynchronous processing identifier currently acquired by the API management system 104).

In Step S1108, the API request/response processing unit 212 updates the API processing time performance data T2 based on the API request/response management data T3 and the current time point. Further, the API request/response processing unit 212 deletes the record of the API request/response management data T3, which has been specified in Step S1103. With the above description, the API request/response processing is ended.

Next, processing performed by the API management system 104 in the development phase S111 will be described.

Figure 13:
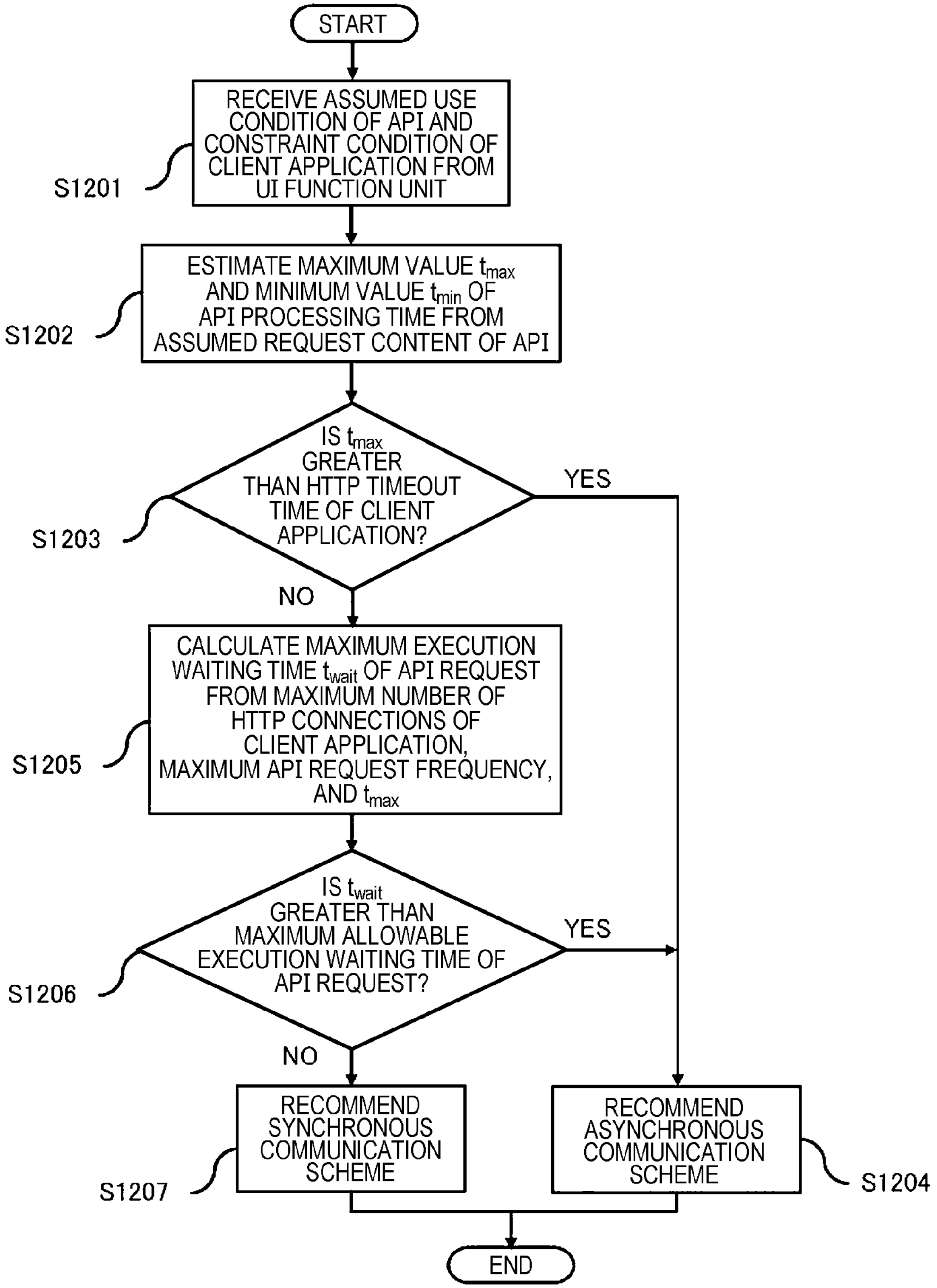
FIG. 13 is a flowchart illustrating an example of communication scheme proposal processing.

Development Phase (Communication Scheme Proposal Processing) FIG. 13 is a flowchart illustrating an example of communication scheme proposal processing (corresponding to Steps S122 and S123) which is processing performed by the API processing time estimation unit 214 in the development phase S111.

The API processing time estimation unit 214 receives an assumed request and a constraint condition from the UI function unit 215 (Step S1201). In the present embodiment, it is assumed that the value and the time point included in the assumed request are given in the form of a range of a value, a time point, or the like by designating the maximum value and the minimum value. The API processing time estimation unit 214 estimates an API processing time based on the assumed request of the API received in Step S1201 (Step S1202).

For example, the API processing time estimation unit 214 specifies a record in which information corresponding to the assumed request is set in the client application ID 912, the API ID 811, and the performance value 915, with reference to each record in the API processing time performance data T2, and calculates the maximum value tmax and the minimum value tmin of the API processing time based on the API processing start time point 913 and the API processing end time point 914 of this record (Step S1202). In the present embodiment, since the value or the time point of the assumed request is given in a range, the calculated API processing time has a numerical range.

Note that the API processing time estimation unit 214 may estimate the API processing time by creating a learned model in which a correlation of each data in the API processing time performance data T2 (a relationship between an API and each feature amount (input value) and a processing time (output value)) is learned by using machine learning such as a gradient boosting decision tree or a neural network and inputting an assumed request content of the API to the learned model, instead of referring to the API processing time performance data T2.

The API processing time estimation unit 214 determines whether or not tmax calculated in Step S1201 is longer than the timeout time of the HTTP connection of the client application system 103 (Step S1203). In a case where tmax is longer than the timeout time (Step S1203: YES), the API processing time estimation unit 214 executes the process of Step S1204. In a case where tmax is not longer than the timeout time (Step S1203: NO), the API processing time estimation unit 214 executes the process of Step S1206.

In Step S1205, the API processing time estimation unit 214 calculates the current maximum execution waiting time twait of the API request from tmax, and the maximum number of HTTP connections and the maximum API request frequency (it is assumed that these types of information are set in advance) that can be simultaneously held from the client application system 103 for a single host. Here, for example, the queue theory or the like is used for calculation of twait.

The API processing time estimation unit 214 determines whether or not twait is longer than the maximum execution waiting time t*wait of the API request, which is allowable by the developer 3 of the client application (Step S1206).

In a case where twait is longer than t*wait (Step S1206: YES), the API processing time estimation unit 214 creates communication scheme proposal: information having a content indicating that the asynchronous communication scheme is recommended to the developer 3 of the client application (Step S1204). With the above description, the communication scheme proposal processing is ended.

On the other hand, in a case where twait is not longer than t*wait (Step S1206: NO), the API processing time estimation unit 214 creates communication scheme proposal information having a content indicating that the synchronous communication scheme is recommended to the developer 3 of the client application (Step S1207). With the above description, the communication scheme proposal processing is ended.

Note that, in Steps S1203, S1205, and S1206, the API processing time estimation unit 214 creates the communication scheme proposal information based on the constraint condition such as the timeout time of the HTTP connection in the client application system 103 and tmax calculated in Step S1202, but may create the communication scheme proposal information by using other parameters. For example, the API processing time estimation unit 214 may accept an input of a threshold value for tmax from the developer 3 of the client application, create communication scheme proposal information having a content indicating that the asynchronous communication scheme is recommended if tmax is greater than the threshold value, and create communication scheme proposal information having a content indicating that the synchronous communication scheme is recommended when tmax is not greater than the threshold value.

Next, details of the API request type determination processing described in the API request/response processing will be described.

API Request Type Determination Processing

Figure 14:
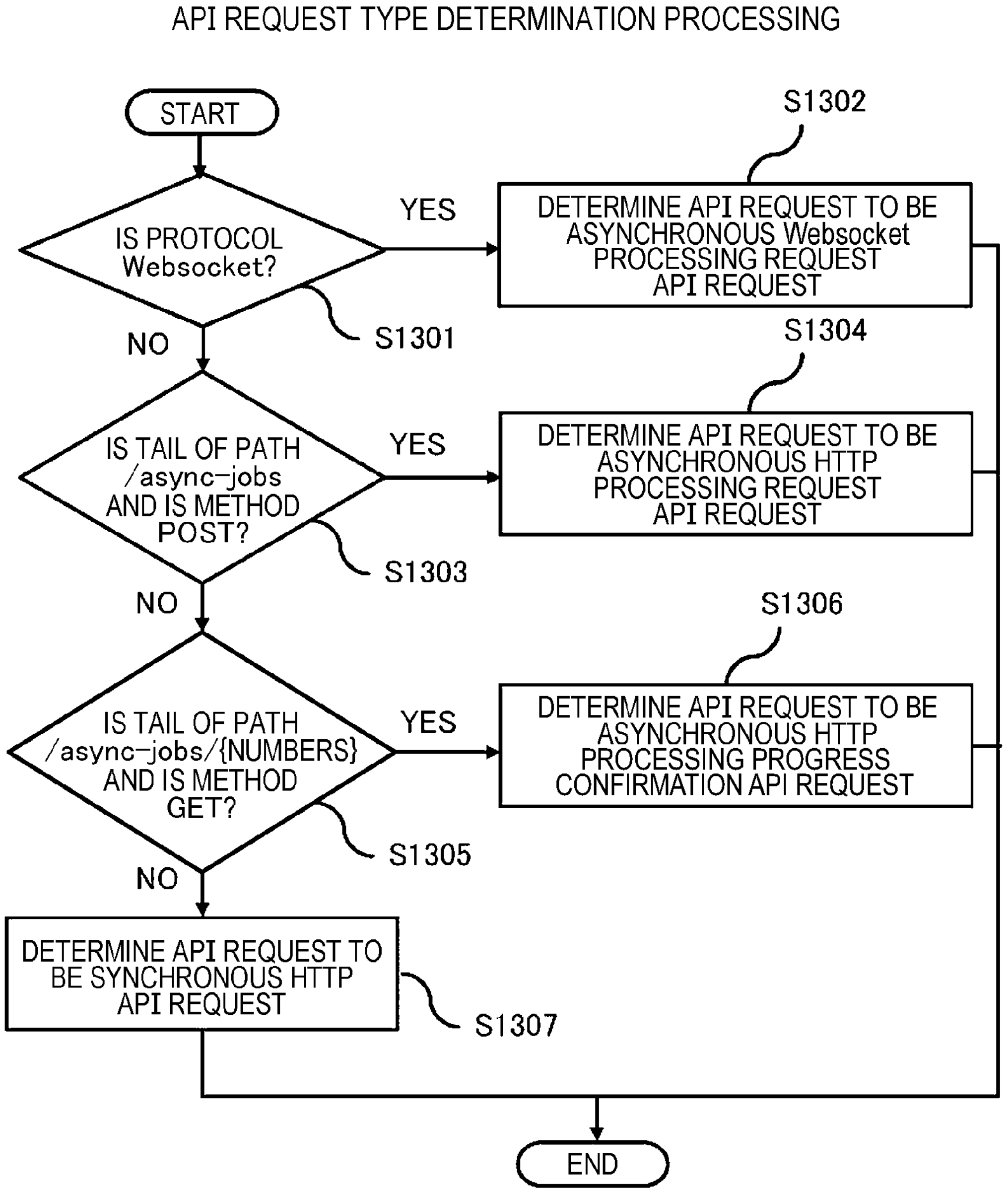
FIG. 14 is a flowchart illustrating an example of API request type determination processing.

FIG. 14 is a flowchart illustrating an example of the API request type determination processing of determining the type of the API request from the client application system 103. Here, it is assumed that the communication scheme between the client application system 103 and the API management system 104 is Websocket which is an asynchronous bidirectional communication scheme, but the same applies to other communication schemes.

First, when receiving an API request from the client application communication unit 211, the API request/response processing unit 212 determines whether or not the communication scheme is Websocket based on the format of the API request (Step S1301).

When the communication scheme is Websocket (Step S1301: YES), the API request/response processing unit 212 determines that the API request is an asynchronous Websocket processing request API request (Step S1302), and the API request type determination processing is ended. On the other hand, when the communication scheme is not Websocket (Step S1301: NO), the API request/response processing unit 212 executes the process of Step S1303.

In Step S1303, the API request/response processing unit 212 analyzes the received API request, and determines whether or not the API request is a processing request API request of the asynchronous HTTP method. For example, the API request/response processing unit 212 determines whether or not to satisfy a condition that the tail of a path of a request destination URL of the received API request is "/async-jobs" and the method is POST.

In a case where the API request is the processing request API request of the asynchronous HTTP method (Step S1303: YES), the API request/response processing unit 212 determines that the received API request is the processing request API request related to the asynchronous HTTP method (Step S1304). In a case where the API request is not the processing request API request of the asynchronous HTTP method (Step S1303: NO), the API request/response processing unit 212 executes the process of Step S1305.

In Step S1305, the API request/response processing unit 212 analyzes the received API request, and determines whether or not the API request is a processing progress confirmation API request related to the asynchronous HTTP method. For example, the API request/response processing unit 212 determines whether or not to satisfy a condition that the tail of a path of a request destination URL of the received API request is "/async-jobs/{async-job-id}" and the method is GET. Here, "async-job-id" is a certain numerical value or character string representing the asynchronous processing identifier in the API management system 104.

In a case where the API request is the processing progress confirmation API request related to the asynchronous HTTP method (Step S1305: YES), the API request/response processing unit 212 determines that the received API request is the processing progress confirmation API request of the asynchronous HTTP method (Step S1306). In a case where the API request is not the processing progress confirmation API request related to the asynchronous HTTP method (Step S1305: NO), the API request/response processing unit 212 determines that the received API request is the synchronous HTTP API request (Step S1307). Then, the API request type determination processing is ended.

Note that, in the present embodiment, as a method in which the API request/response processing unit 212 determines whether or not the API request type from the client application system 103 is the synchronous HTTP method or the asynchronous HTTP method, a method of using the path and the method of the request destination URL is exemplified. The synchronous scheme or the asynchronous scheme may be determined by using other parameters. For example, the API request/response processing unit 212 may use a header, a query string, or a payload to determine the synchronous scheme or the asynchronous scheme. In addition, it is assumed that the asynchronous processing identifier or the processing progress information is set in the payload in a processing request API request 1501, a processing acceptance API response 1502, a processing progress confirmation API request 1503, a processing incompletion API response 1504, and a processing completion API response 1505. Each type of information may be set in other fields (for example, the header). Furthermore, it is assumed that information for uniquely specifying the client application system 103 is set in the header in each API request, but the information may be set by using another method (for example, the query string).

Example of Data Structure of API Request and API Response

Next, specific examples of an API request and an API response transmitted and received between the client application system 103 and the API management system 104 will be described.

Figure 15:
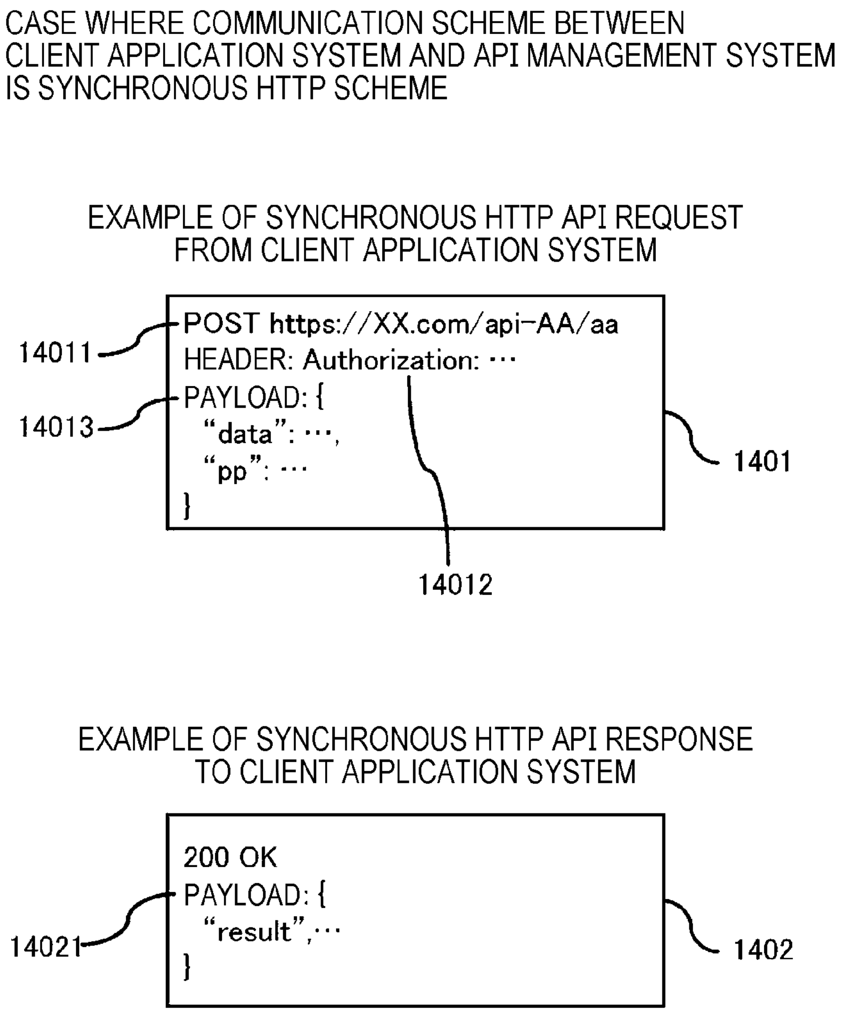
FIG. 15 is a diagram illustrating an example of an API request and an API response when communication between the client application system and the API management system is the synchronous HTTP method.

FIG. 15 is a diagram illustrating an example of an API request and an API response when communication between the client application system 103 and the API management system 104 is the synchronous HTTP method. Note that the API request and the API response are a request and a response corresponding to the API indicated by the records 801 and 802 in the API definition data T1 illustrated in FIG. 3.

(Synchronous HTTP API Request)

First, a synchronous HTTP API request 1401 includes POST 14011 as the method, an Authorization field 14012 as the header, and a payload 14013. "XX.com" which is a host name of the API management system 104 is set in POST 14011. An ID (client application ID) of the client application system 103 is included in the Authorization field 14012. Note that the Authorization field 14012 may be used for the purpose of authenticating the API request from the client application system 103.

(Synchronous HTTP API Response)

A synchronous HTTP API response 1402 includes a payload 14021. A processing result "result" in the API server 105 is included in the payload 14021.

Figure 16:
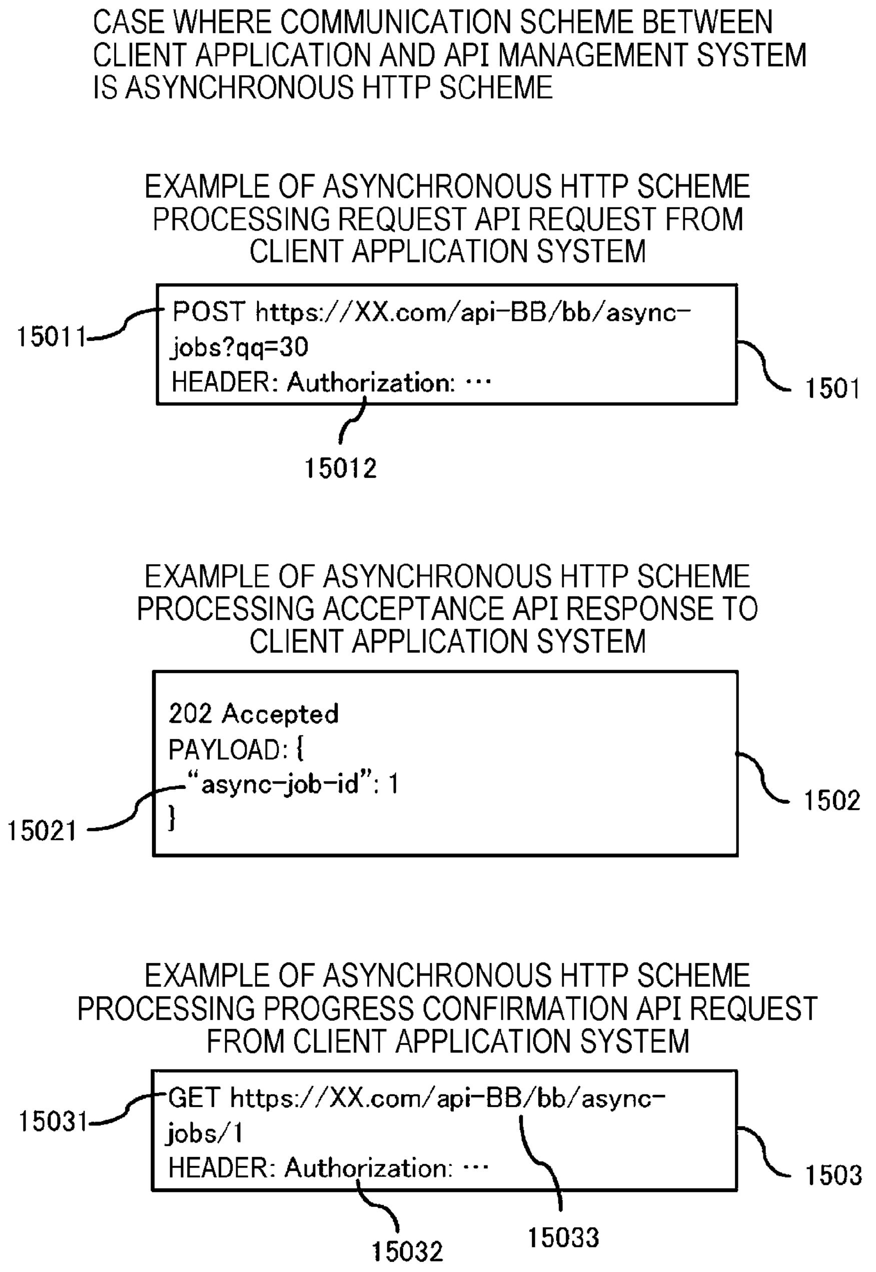
FIG. 16 is a diagram illustrating an example of a processing request API request, a processing acceptance API response, and a processing progress confirmation API request related to asynchronous HTTP.

FIG. 16 is a diagram illustrating an example of an API request and an API response when communication between the client application system 103 and the API management system 104 is the asynchronous HTTP method. Note that the API request and the API response are a request and a response corresponding to the API indicated by the record 803 in the API definition data T1.

(Processing Request API Request Related to Asynchronous HTTP)

A processing request API request 1501 related to asynchronous HTTP includes POST 15011 ("XX.com" and "async-jobs" indicating asynchronous communication are set) which is the method and an Authorization field 15012 which is the header.

(Processing Acceptance API Response Related to Asynchronous HTTP)

A processing acceptance API response 1502 includes async-job-id as an asynchronous processing identifier 15021 in the API management system 104.

(Processing Progress Confirmation API Request Related to Asynchronous HTTP)

A processing progress confirmation API request 1503 includes GET 15031 ("XX.com" is set) which is the method and an Authorization field 15032 which is the header. Then, the value of async-job-id included in the processing acceptance API response 1502 is added to the tail of the path 15033 of the request destination URL of GET 15031.

(Processing Incompletion API Response, Processing Completion API Response Related to Asynchronous HTTP)

Figure 17:
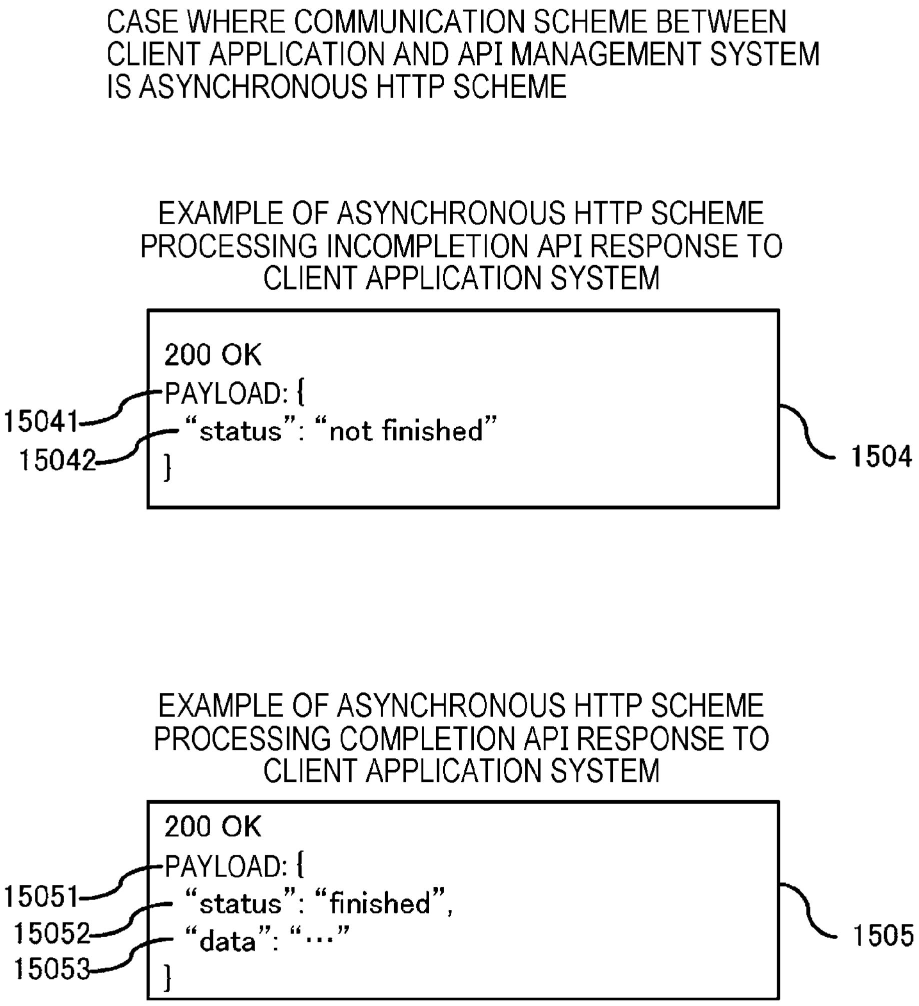
FIG. 17 is a diagram illustrating an example of a processing incompletion API response and a processing completion API response related to the asynchronous HTTP.

FIG. 17 is a diagram illustrating an example of a processing incompletion API response and a processing completion API response related to the asynchronous HTTP.

Payloads 15041 and 15051 of a processing incompletion API response 1504 and a processing completion API response 1505 respectively include status fields 15042 and 15052 indicating the processing progress (processing completion and processing incompletion). Furthermore, the payload 15051 of the processing completion API response 1505 includes a processing result 15053 in the API server 105.

Figure 18:
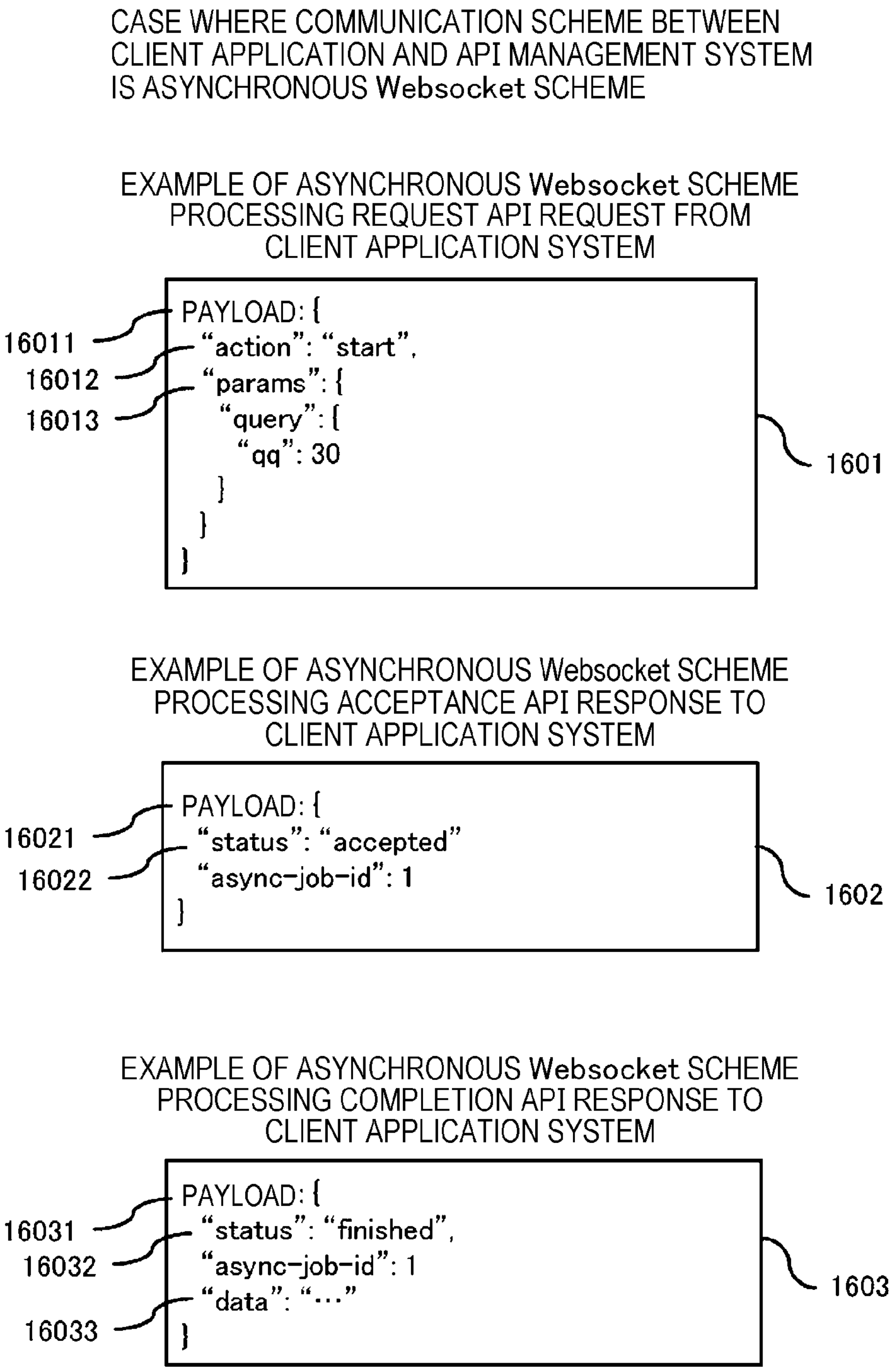
FIG. 18 is a diagram illustrating an example of an API request and an API response when communication between the client application system 103 and the API management system 104 is the asynchronous bidirectional communication scheme.

Next, FIG. 18 is a diagram illustrating an example of an API response and an API response when communication between the client application system 103 and the API management system 104 is the asynchronous bidirectional communication scheme. Note that the asynchronous bidirectional communication scheme is Websocket. In addition, it is assumed that this API request and this API response are a request and a response of the API related to the record 803 in the API definition data T1 illustrated in FIG. 3 in the client application system 103.

(Processing Request API Request)

First, a processing request API request 1601 illustrated in FIG. 18 is an API request of the asynchronous Websocket method from the client application system 103 to the API management system 104. A payload 16011 of the processing request API request 1601 includes an action field 16012 explicitly indicating that processing is to be requested and a params field 16013 indicating request parameters.

Note that it is assumed that the client application system 103 establishes a Websocket connection by setting an endpoint (for example, "wss://XX.com/api-BB/bb?authorization= . . . ") of the API management system 104 before transmitting the processing request API request 1601. Here, an ID (client application ID) of the client application system 103 is included in the query parameter authorization. Note that the authorization parameter may be used for the purpose of authenticating the API request from the client application system 103.

(Processing Acceptance API Response, Processing Completion API Response)

Next, each of a processing acceptance API response 1602 and a processing completion API response 1603 is a response to the processing request API request 1601 from the API management system 104. In the processing acceptance API response 1602 and the processing completion API response 1603, status fields 16022 and 16032 indicating the processing progress are included in payloads 16021 and 16031, respectively. In addition, a processing result 16033 in the API server 105 is included in the processing completion API response 1603.

Note that, in each API request and API response described above, JavaScript Object Notation (JSON) is used as the format of the payload, but other formats may be adopted.

Synchronous/Asynchronous Communication Scheme Proposal Screen

Figure 19:
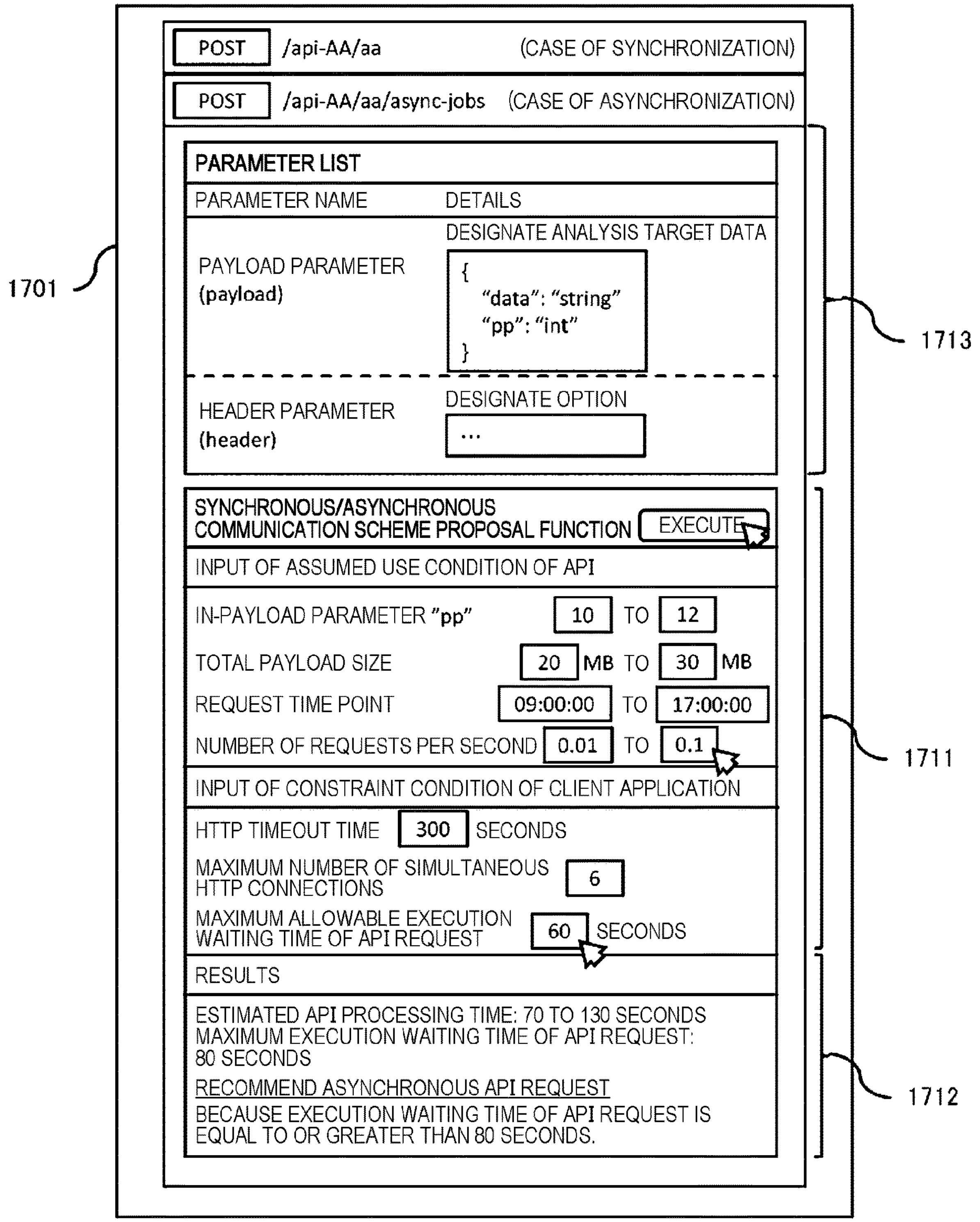
FIG. 19 is a diagram illustrating an example of a synchronous/asynchronous communication scheme proposal screen.

FIG. 19 is a diagram illustrating an example of a synchronous/asynchronous communication scheme proposal screen 1701 for the developer 3 of the client application, which is provided by the API management system 104. The present screen is output to the output device 315 of the client application developer terminal 201 by the UI function unit 215, for example, but may be output to another information processing apparatus.

The synchronous/asynchronous communication scheme proposal screen 1701 includes an input region 1711 for accepting an input from the developer 3 of the client application, a result display region 1712 for displaying the communication scheme proposal information generated by the communication scheme proposal processing, and a reference display region 1713 for displaying reference information.

In the input region 1711, an input of an assumed request (the type of API request, the processing content of API, and the like) and a constraint condition (the timeout time, the maximum execution waiting time, and the like) is accepted for each request method of the endpoint of each API.

In the result display region 1712, the API processing time calculated based on the assumed request input to the input region 1711 and the communication scheme proposal information are displayed. With the input region 1711 and the result display region 1712, the developer 3 of the client application can easily specify a communication scheme suitable for the client application system 103.

In the reference display region 1713, for example, definition data (format) regarding the API, such as the endpoint, the method, or other parameters of the API is displayed. As a result, it is possible to provide convenience when the developer 3 of the client application inputs the assumed request to the input region 1711.

Embodiment 2

In Embodiment 1, the description proceeded on the assumption that, in the execution phase S112, the client application system 103 communicates with the API management system 104 by either the synchronous or asynchronous communication scheme determined in the development phase S111.

In contrast, in Embodiment 2, the client application system 103 switches the synchronous or asynchronous communication scheme for each API request from the client application system 103 in the execution phase S112.

A communication scheme for performing switching as in Embodiment 2 is referred to below as a "synchronous/asynchronous hybrid scheme". In particular, in a case where HTTP is used as the communication protocol, such a communication scheme is referred to as a "synchronous/asynchronous hybrid HTTP method".

Processing of the API management system 104 in the case of using the synchronous/asynchronous hybrid HTTP method will be described focusing on the differences from Embodiment 1. Note that, in the present embodiment, as a criterion for performing switching between synchronization and asynchronization, it is assumed that, when the estimated value of the API processing time is greater than a certain threshold value, the scheme is switched to the asynchronous scheme, and when the estimated value is smaller than the certain threshold value, the scheme is switched to the synchronous scheme. Another criterion may be used.

Figure 20:
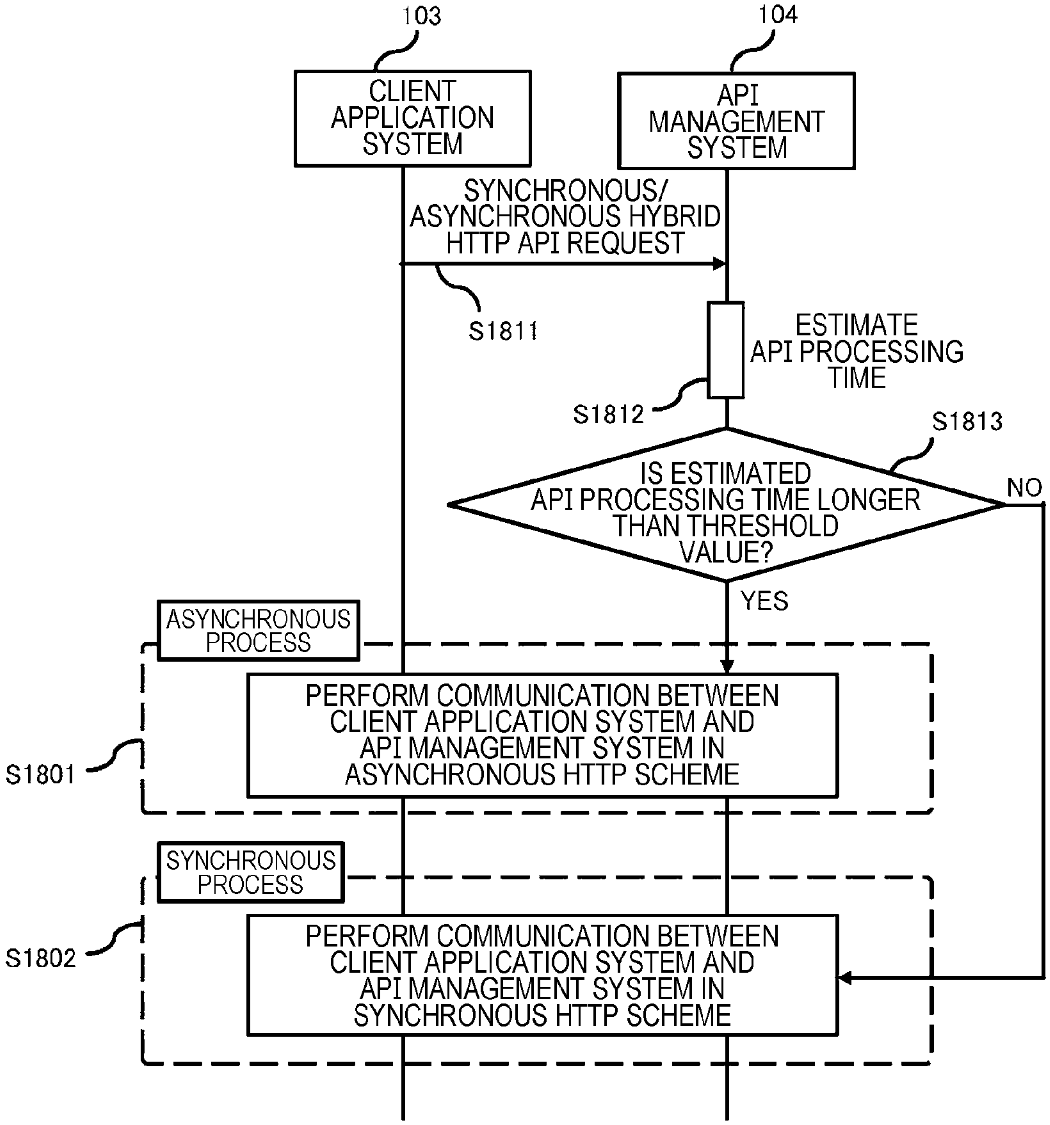
FIG. 20 is a sequence diagram illustrating an example of processing in a case where a client application system and an API management system use a synchronous/asynchronous hybrid HTTP method in an execution phase according to Embodiment 2.

FIG. 20 is a sequence diagram illustrating an example of processing (processes of Step S126 to Step S134) in a case where the client application system 103 and the API management system 104 use the synchronous/asynchronous hybrid HTTP method in the execution phase S112 according to Embodiment 2. Note that the communication processing between the API management system 104 and the API server 105 is similar to that of Embodiment 1, and thus a description thereof will be omitted.

First, the client application system 103 transmits an API request (synchronous/asynchronous hybrid HTTP API request) to the API management system 104. Here, the synchronous/asynchronous hybrid HTTP API request includes information indicating that the synchronous or asynchronous hybrid HTTP method is used as a plurality of selectable communication schemes, and information of the criterion for performing switching between synchronization and asynchronization (in the present embodiment, information of an API processing time serving as a threshold value for switching the communication scheme) (Step S1811).

Figure 21:
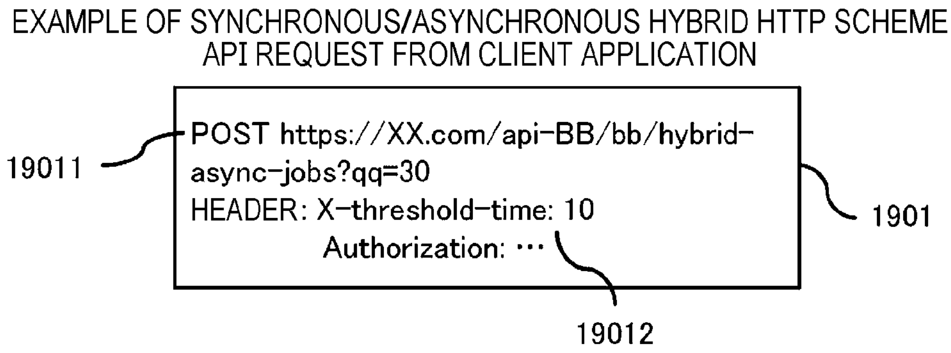
FIG. 21 is a diagram illustrating an example of a synchronous/asynchronous hybrid HTTP API request transmitted to the API management system.

Here, FIG. 21 is a diagram illustrating an example of a synchronous/asynchronous hybrid HTTP API request 1901 transmitted to the API management system 104. Note that this API request is assumed to be a request related to the API indicated by the record 803 of the API definition data T1 illustrated in FIG. 3 in the client application system 103.

The synchronous/asynchronous hybrid HTTP API request 1901 includes POST 19011 as a method, and "/hybrid-async-jobs" indicating that the synchronous/asynchronous hybrid HTTP method is used is set in the path of POST 19011. Furthermore, information indicating that the API processing time serving as the threshold value for switching the communication scheme is "10 seconds" is set in an X-threshold-time field 19012 of a header of the synchronous/asynchronous hybrid HTTP API request 1901. Note that the information indicating that the synchronous/asynchronous hybrid HTTP method is used in the synchronous/asynchronous hybrid HTTP API request 1901 may be set in a header, a query string, or a payload instead of the method. Furthermore, the threshold value for switching the communication scheme may be set in the query string or the payload instead of the header.

Subsequently, as illustrated in Step S1812 of FIG. 20, the API management system 104 estimates the API processing time from the parameters and the constraint conditions included in the API request received in Step S1811, similarly to Embodiment 1.

The API management system 104 determines whether or not the estimated value of the API processing time estimated in Step S1812 is longer than a threshold value designated in the API request (Step S1813).

In a case where the estimated value of the API processing time is longer than the threshold value designated in the API request (Step S1812: YES), the API management system 104 executes an asynchronous process S1801. In a case where the estimated value of the API processing time is not longer than the threshold value designated in the API request (Step S1812: NO), the API management system 104 executes a synchronous process S1802.

In the asynchronous process S1801, the API management system 104 performs communication between the client application system 103 and the API management system 104 by the asynchronous HTTP method, similarly to the sequence illustrated in Steps S129 to S139 of Embodiment 1.

In the synchronous process S1802, the API management system 104 performs communication between the client application system 103 and the API management system 104 by the synchronous HTTP method, similarly to the sequence illustrated in Steps S513 to S522 of Embodiment 1.

Note that, in Steps S1801 and S1802, formats of an API request and an API response transmitted and received between the client application system 103 and the API management system 104 may be similar to those of Embodiment 1.

As described above, according to the API management system 104 in the present embodiment, for example, in a case where a plurality of API requests having processing times greatly different for each API is accepted from the same client application system 103, it is possible to efficiently process each type of API processing in particular. For example, in a case where, even though the developer 3 of the client application receives a communication scheme proposal (communication scheme proposal information) from the API management system 104, it is difficult to determine which of synchronous and asynchronous communication schemes is optimal in the relationship with the client application system 103 that is the transmission source of the API request, it is possible to determine a communication scheme for efficiently processing each type of API processing.

Note that the synchronous/asynchronous hybrid HTTP method by the API management system 104 and the client application system 103 in the present embodiment may be combined with the synchronous HTTP method, the asynchronous HTTP method, or the asynchronous bidirectional communication scheme described in Embodiment 1. In this case, in the development phase S111, the API management system 104 may allow the developer 3 (client application developer terminal 201) of the client application to select the communication scheme between the client application system 103 and the API management system 104 from the synchronous/asynchronous hybrid HTTP method, the synchronous HTTP method, the asynchronous HTTP method, or the asynchronous bidirectional communication scheme.

As described in each of the above embodiments, the API management system 104 in the present embodiment estimates the required time (API processing time) required for the API server 105 to execute the API in response to the API request by analyzing the processing content of an API indicated by the API request (assumed request) received from the client application user terminal 206 or the like, and determines the communication scheme used for transmitting the API request for causing the API server 105 to execute the API, to be either the synchronous communication or the asynchronous communication based on the estimated API processing time.

That is, the API management system 104 in each embodiment can communicate with the API server 105 by the communication scheme according to the processing time of the API to be executed. For example, the developer 3 of the client application can determine the communication scheme for efficiently executing an API only by providing an assumed request of the API intended to be executed to the API management system 104.

As described above, according to the API management system 104 in each embodiment, it is possible to determine a communication scheme capable of causing the API to be efficiently executed in accordance with the processing content of the API. For example, the developer 3 of the client application can select an appropriate synchronous or asynchronous communication scheme to implement API calling processing in the client application system 103. As a result, it is possible to optimize the development burden of the developer 3 of the client application and the resource consumption of the client application system 103.

Furthermore, the API processing time estimation unit 214 of the API management system 104 in each embodiment estimates the API processing time based on the API definition data T1 (information storing the relationship between the parameter (feature amount or the like) characterizing the processing content of the API and the processing time) and the processing content of the API specified by the information indicated by the assumed request.

By using the API definition data T1, it is possible to accurately estimate the API processing time in accordance with the processing content of the API.

In addition, the API processing time estimation unit 214 of the API management system 104 in each embodiment determines whether or not the API processing time is longer than the predetermined threshold value (for example, the maximum execution waiting time), determines the communication scheme as the asynchronous communication scheme in a case where the API processing time is longer than the threshold value, and determines the communication scheme as the synchronous communication scheme in a case where the API processing time is equal to or smaller than the threshold value.

As described above, by changing the asynchronous or synchronous communication scheme in accordance with the length of the API processing time, it is possible to more shorten the processing time required in relation to the execution of the API.

In addition, the API processing time estimation unit 214 of the API management system 104 in each embodiment estimates the API processing time by analyzing the information of the communication scheme (protocol) specified by the assumed request and the information of the processing type (method or the like).

Thus, it is possible to accurately estimate the API processing time in accordance with the content of the request.

Furthermore, the API management system 104 in each embodiment further includes the UI function unit 215 that receives an assumed request including the information of the timeout time during which the client application system 103 can wait for execution of the API. The API processing time estimation unit 214 determines whether or not the API processing time is longer than the timeout time, and determines the communication scheme as the asynchronous communication scheme in a case where the API processing time is longer than the timeout time.

As a result, it is possible to determine a communication scheme according to the communication specification of the client application system 103.

Furthermore, the API management system 104 in Embodiment 2 further includes the UI function unit 215 that receives the synchronous/asynchronous hybrid HTTP API request indicating a plurality of selectable communication schemes from the client application system 103. The API processing time estimation unit 214 determines the communication scheme with the client application system 103 regarding the API related to the synchronous/asynchronous hybrid HTTP API request from the plurality of communication schemes based on the API processing time estimated based on the received synchronous/asynchronous hybrid HTTP API request.

In this manner, by designating options of the communication scheme by the API request, the API management system 104 can determine an appropriate communication scheme according to the client application system 103 and the processing content of API.

In addition, the API management system 104 in each embodiment further includes the UI function unit 215 that displays information of the determined communication scheme (on the synchronous/asynchronous communication scheme proposal screen 1701).

As a result, the developer 3 or the like of the client application can confirm a communication scheme (protocol) to be implemented with respect to the API used for developing the client application.

In addition, the API management system 104 in each embodiment further includes the UI function unit 215 that displays the input screen (the synchronous/asynchronous communication scheme proposal screen 1701) for accepting the assumed request and the input of the processing content of the API indicated by the assumed request from the user.

As a result, the developer 3 or the like of the client application can set conditions for various APIs used for developing the client application, and cause the API management system 104 to determine a communication scheme (protocol) to be implemented.

The present invention is not limited to the embodiments described above, and includes various modifications. The above-described embodiments have been described in detail for better understanding of the present invention, and are not necessarily limited to those having all the configurations of the description.

For example, a part of each function included in each device of each embodiment may be provided in another device, or a function included in another device may be provided in the same device.

In addition, in each embodiment, the example of the synchronous or asynchronous HTTP and the synchronous bidirectional Websocket has been described as the communication scheme, but the present invention is similarly applicable to any other synchronous or asynchronous communication scheme.

REFERENCE SIGNS LIST

1 API development execution system
105 API server
103 Client application system
104 API management system
212 API request/response processing unit
214 API processing time estimation unit

The invention claimed is:

1. An application programming interface (API) management system comprising:

a processor;

a memory storing instructions that, when executed by the processor, cause the processor to perform operations; and a user interface that receives information of an execution request of an API, the information of the execution request of the API including information of a timeout time during which a terminal that requests execution of the API waits for execution of the API, wherein the operations comprise:

acquire information of the execution request of the API, estimate a required time required for a predetermined information processing apparatus to execute the API in response to the information of the execution request of the API by analyzing processing content of the API indicated by the information of the execution request of the API, determine a communication scheme used for transmitting a request for causing the predetermined information processing apparatus to execute the API to be either synchronous communication or asynchronous communication based on the estimated required time; and determine whether or not the estimated required time is longer than the timeout time, and determine the communication scheme to be asynchronous when the estimated required time exceeds the timeout time.

2. The API management system according to claim 1, wherein the processor is configured to estimate the required time based on a processing content of an API specified by information storing a relationship between a parameter characterizing the processing content of the API and a required time related to the API, and the acquired information of the execution request of the API.

3. The API management system according to claim 1, wherein the processor is configured to determine whether the estimated required time is longer than a predetermined threshold value, determine the communication scheme to be an asynchronous communication scheme in a case where it is determined that the estimated required time is longer than the predetermined threshold value, and determine the communication scheme to be a synchronous communication scheme in a case where it is determined that the estimated required time is equal to or shorter than the predetermined threshold value.

4. The API management system according to claim 1, wherein the processor is configured to estimate the required time by analyzing information of a communication scheme specified by the information of the execution request of the API and information of a processing type.

5. The API management system according to claim 1, wherein the processor is further configured to receive, via a user interface, an execution request of an API indicating a plurality of selectable communication schemes from another information processing apparatus, wherein the processor is further configured to estimate a required time required to execute the API based on the received execution request by analyzing a processing content of the API indicated by the execution request, and determine a communication scheme with the terminal regarding the API related to the execution request of the API from the plurality of communication schemes based on the estimated required time.

6. The API management system according to claim 1, wherein the processor is further configured to display, via a user interface, information of the determined communication scheme.

7. The API management system according to claim 1, wherein the processor is further configured to display, via a user interface, an input screen for accepting an input of a processing content of the API in the information of the execution request of the API from a user.

8. An application programming interface (API) management method of causing an information processing apparatus to execute API processing time estimation processing comprising:

receiving, by a user interface, information of an execution request of an API, the information of the execution request of the API including information of a timeout time in which a terminal that requests execution of the API is enabled to wait for execution of the API;

acquiring information of an execution request of an API;

estimating a required time required for a predetermined information processing apparatus to execute the API in response to the information of the execution request of the API by analyzing a processing content of the API indicated by the information of the execution request of the API;

determining a communication scheme used for transmitting a request for causing the predetermined information processing apparatus to execute the API to be either synchronous communication or asynchronous communication based on the estimated time; and determining whether or not the estimated required time is longer than the timeout time, and determining the communication scheme to be the asynchronous communication scheme in a case where the estimated required time is longer than the timeout time.

9. The API management method according to claim 8, wherein estimating the required time includes estimating the required time based on a processing content of an API specified by information storing a relationship between a parameter characterizing the processing content of the API and a required time related to the API, and the acquired information of the execution request of the API.

10. The application programming interface (API) management method according to claim 8, further comprising:

determining whether the estimated required time is longer than a predetermined threshold value;

determining the communication scheme to be an asynchronous communication scheme when the estimated required time is longer than the predetermined threshold value; and determining the communication scheme to be a synchronous communication scheme when the estimated required time is equal to or shorter than the predetermined threshold value.

11. The application programming interface (API) management method according to claim 8, wherein estimating the required time includes estimating the required time by analyzing information of a communication scheme specified by the information of the execution request of the API and information of a processing type.

12. The application programming interface (API) management method according to claim 8, further comprising:

receiving, via a user interface, an execution request of an API indicating a plurality of selectable communication schemes from another information processing apparatus;

estimating a required time required to execute the API based on the received execution request by analyzing a processing content of the API indicated by the execution request; and determining a communication scheme with the terminal regarding the API related to the execution request of the API from the plurality of communication schemes based on the estimated required time.

13. The application programming interface (API) management method according to claim 8, further comprising displaying, via a user interface, information of the determined communication scheme.

14. The application programming interface (API) management method according to claim 8, further comprising displaying, via a user interface, an input screen for accepting an input of a processing content of the API in the information of the execution request of the API from a user.

* * * * *